United States Patent
Park et al.

(10) Patent No.: US 9,450,721 B2
(45) Date of Patent: Sep. 20, 2016

(54) METHOD AND APPARATUS FOR TRANSMITTING AND RECEIVING REFERENCE SIGNAL IN WIRELESS COMMUNICATION SYSTEM

(71) Applicant: LG ELECTRONICS INC., Seoul (KR)

(72) Inventors: Jonghyun Park, Anyang-si (KR); Kijun Kim, Anyang-si (KR); Hakseong Kim, Anyang-si (KR); Byounghoon Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 59 days.

(21) Appl. No.: 14/385,352

(22) PCT Filed: Mar. 25, 2013

(86) PCT No.: PCT/KR2013/002452
§ 371 (c)(1),
(2) Date: Sep. 15, 2014

(87) PCT Pub. No.: WO2013/147476
PCT Pub. Date: Oct. 3, 2013

(65) Prior Publication Data
US 2015/0071195 A1  Mar. 12, 2015

Related U.S. Application Data

(60) Provisional application No. 61/615,276, filed on Mar. 24, 2012, provisional application No. 61/615,880, filed on Mar. 26, 2012, provisional application No. 61/617,676, filed on Mar. 30, 2012, provisional
(Continued)

(51) Int. Cl.
*H04W 4/00* (2009.01)
*H04L 5/00* (2006.01)
(Continued)

(52) U.S. Cl.
CPC .......... *H04L 5/0048* (2013.01); *H04L 27/261* (2013.01); *H04W 72/042* (2013.01); *H04W 72/0413* (2013.01); *H04L 5/0016* (2013.01); *H04L 5/0035* (2013.01); *H04L 5/0055* (2013.01); *H04L 5/0057* (2013.01)

(58) Field of Classification Search
None
See application file for complete search history.

(56) References Cited

U.S. PATENT DOCUMENTS

| | | |
|---|---|---|
| 2010/0002800 A1 | 1/2010 | Kim et al. |
| 2010/0080154 A1 | 4/2010 | Noh et al. |

(Continued)

OTHER PUBLICATIONS

Catt, "Further details on UE-specific UL DMRS", R1-120106, 3GPP TSG RAN WG1 Meeting #68, Dresden, Germany, Feb. 6-10, 2012, 4 pages.

(Continued)

*Primary Examiner* — Michael J Moore, Jr.
(74) *Attorney, Agent, or Firm* — Birch, Stewart, Kolasch & Birch, LLP

(57) ABSTRACT

The present invention relates to a wireless communication system and, more specifically, to a method and an apparatus for transmitting and receiving a reference signal (RS). The method for enabling user equipment (UE) of the wireless communication system to transmit an uplink signal according to one embodiment of the present invention comprises the steps of: receiving information on candidates of a first parameter set used for generating a sequence of a first RS; and generating and transmitting a sequence of a second RS using a second parameter set determined among the candidates of the first parameter set.

15 Claims, 14 Drawing Sheets

Related U.S. Application Data application No. 61/677,469, filed on Jul. 30, 2012, provisional application No. 61/679,062, filed on Aug. 2, 2012, provisional application No. 61/682,303, filed on Aug. 12, 2012.

(51) Int. Cl.
*H04L 27/26* (2006.01)
*H04W 72/04* (2009.01)

(56) References Cited

U.S. PATENT DOCUMENTS

| | | |
|---|---|---|
| 2011/0199986 A1 | 8/2011 | Fong et al. |
| 2011/0269489 A1 | 11/2011 | Khoshnevis et al. |
| 2012/0176939 A1 | 7/2012 | Qu et al. |
| 2012/0320847 A1* | 12/2012 | Nam ............... H04W 72/0406 370/329 |
| 2013/0077569 A1* | 3/2013 | Nam ............... H04W 52/288 370/328 |
| 2013/0155974 A1* | 6/2013 | Papasakellariou .. H04W 72/042 370/329 |
| 2013/0163537 A1* | 6/2013 | Anderson ......... H04W 72/1284 370/329 |
| 2014/0204853 A1* | 7/2014 | Ko ..................... H04L 5/0073 370/329 |
| 2014/0307699 A1* | 10/2014 | Sorrentino ........... H04L 5/0007 370/329 |

OTHER PUBLICATIONS

Ericsson et al., "Details on UL DMRS", R1-120772, 3GPP TSG RAN WG1 Meeting #68, Dresden, Germany, Feb. 6-10, 2012, 7 pages.

Intel Corporation, "A Signaling Framework for UL CoMP", R1-120206, 3GPP TSG-RAN WG1 #68, Dresden, Germany, Feb. 6-10, 2012, 5 pages.

Pantech, "UL DM-RS enhancements for Rel-11", R1-120324, 3GPP TSG RAN WG1 Meeting #68, Dresden, Germany, Feb. 6-10, 2012, 8 pages.

Panasonic, "Enhancement of control signalling for UL CoMP", R1-120232, 3GPP TSG-RAN WG1 Meeting #68, Dresden, Germany, Feb. 6-10, 2012, 4 pages.

Qualcomm Incorporated, "SRS enhancements in support of Uplink CoMP," R1-120555, 3GPP TSG-RAN WG1 #68, Dresden, Germany, Feb. 6-10, 2012, 5 pages.

\* cited by examiner

PUCCH format 1a/1b structure (normal CP)

PUCCH format 1a/1b structure (extended CP)

PUCCH format 2/2a/2b structure (normal CP)

PUCCH format 2/2a/2b structure (extended CP)

METHOD AND APPARATUS FOR TRANSMITTING AND RECEIVING REFERENCE SIGNAL IN WIRELESS COMMUNICATION SYSTEM

CROSS REFERENCE TO RELATED APPLICATIONS

This application is the National Phase of PCT International Application No. PCT/KR2013/002452, filed on Mar. 25, 2013, which claims priority under 35 U.S.C. 119(e) to U.S. Provisional Application Nos. 61/615,276, filed on Mar. 24, 2012, 61/615,880 filed on Mar. 26, 2012, 61/617,676 filed on Mar. 30, 2012, 61/677,469 filed on Jul. 30, 2012, 61/679,062 filed on Aug. 2, 2012, and 61/682,303 filed on Aug. 12, 2012, all of which are hereby expressly incorporated by reference into the present application.

TECHNICAL FIELD

The present invention relates to a wireless communication system and, more particularly, to a method and apparatus for transmitting and receiving a reference signal.

BACKGROUND ART

To satisfy increasing data throughput in a wireless communication system, Multiple Input Multiple Output (MIMO) technology, Coordinated Multi-Point (CoMP) technology, etc. for increasing the amount of data transmitted within a limited frequency band have been developed.

An enhanced wireless communication system which supports CoMP for allowing a plurality of evolved Node Bs (eNBs) to communicate with a User Equipment (UE) using the same time-frequency resource can provide increased data throughput compared to a legacy wireless communication system in which a single eNB communicates with a UE. The eNBs participating in CoMP may be referred to as cells, antenna ports, antenna port groups, Remote Radio Heads (RRHs), transmission points, reception points, access points, etc.

DISCLOSURE

Technical Problem

With the introduction of new wireless communication technology, the number of UEs to be served by an eNB in a predetermined resource region is increased and the amount of data and control information to be transmitted to/received from the UEs is also increased. Since the amount of radio resource usable for communication with the UEs is finite, a new method for allowing the eNB to efficiently receive/ transmit uplink/downlink data and/or uplink/downlink control information from/to the UEs using the finite radio resource is required.

An object of the present invention devised to solve the problem lies in a new method for transmitting and receiving an enhanced uplink/downlink reference signal.

It is to be understood that both the foregoing general description and the following detailed description of the present invention are exemplary and explanatory and are intended to provide further explanation of the invention as claimed.

Technical Solution

The object of the present invention can be achieved by providing a method for transmitting an uplink signal by a User Equipment (UE) in a wireless communication system, the method including receiving information about candidates of a first parameter set used to generate a sequence of a first Reference Signal (RS), and generating and transmitting a sequence of a second RS using a second parameter set determined among the candidates of the first parameter set.

In another aspect of the present invention, provided herein is a User Equipment (UE) for transmitting an uplink signal, the UE including a receiver, a transmitter, and a processor, wherein the processor is configured to receive information about candidates of a first parameter set used to generate a sequence of a first Reference Signal (RS), using the receiver, to generate a sequence of a second RS using a second parameter set determined among the candidates of the first parameter set, and to transmit the second RS using the transmitter.

The followings may be commonly applied to the method and the UE.

A group hopping pattern of the second RS may be determined based on a Physical Cell Identifier (PCI), and a sequence hopping pattern of the second RS may be determined based on the second parameter set determined among the candidates of the first parameter set.

A group hopping pattern of the second RS may be determined based on the second parameter set determined among the candidates of the first parameter set, and a sequence hopping pattern of the second RS may be determined based on a PCI.

The first RS may be a Physical Uplink Shared Channel (PUSCH) Demodulation Reference Signal (DMRS) or a Physical Uplink Control Channel (PUCCH) DMRS.

The method may further include receiving information about candidates of a third parameter set used to generate a sequence of a third RS.

A group hopping pattern of the second RS may be determined based on the second parameter set determined among the candidates of the first parameter set, and a sequence hopping pattern of the second RS may be determined based on the second parameter set determined among the candidates of the third parameter set.

The first RS may be a PUCCH DMRS and the third RS may be a PUSCH DMRS.

The first parameter set may include one or more Virtual Cell Identifiers (VCIs).

The first parameter set may include one or more sequence shift offsets ($\Delta_{ss}$).

The second RS may be a Sounding Reference Signal (SRS).

The first RS may be a Channel State Information (CSI)-RS or a UE-specific RS.

The information about the candidates of the first parameter set may be provided through higher layer signaling.

The second parameter set may be indicated using Downlink Control Information (DCI).

It is to be understood that both the foregoing general description and the following detailed description of the present invention are exemplary and explanatory and are intended to provide further explanation of the invention as claimed.

Advantageous Effects

According to the present invention, a new method for transmitting and receiving an enhanced uplink/downlink reference signal may be provided.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
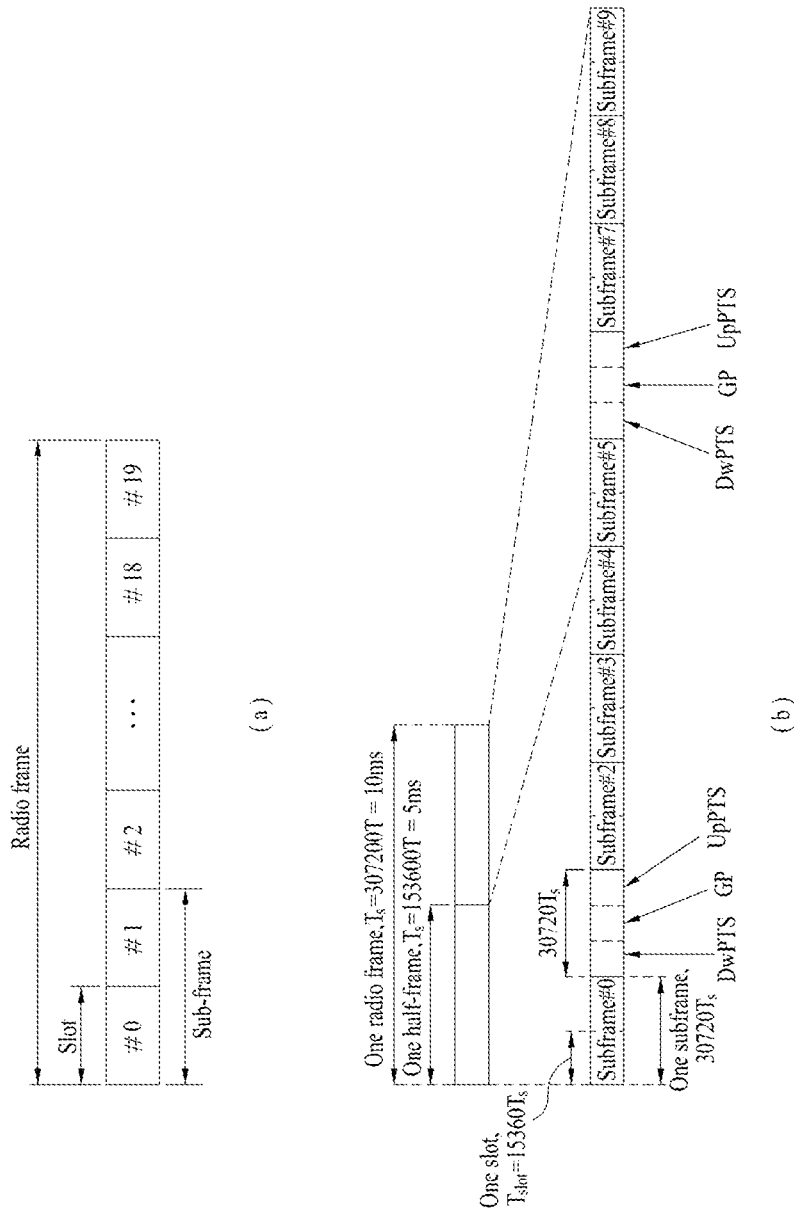
FIG. 1 is a view for describing the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is given, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The 'BS' may be replaced with the term 'fixed station', 'Node B', 'evolved Node B (eNode B or eNB)' or 'Access Point (AP)'. The term 'relay' may be replaced with the term 'Relay Node (RN)' or 'Relay Station (RS)'. The term 'terminal' may be replaced with the term 'TIE', 'Mobile Station (MS)', 'Mobile Subscriber Station (MSS)' or 'Subscriber Station (SS)'.

Specific terms used in the embodiments of the present invention are provided to aid in the understanding of the present invention. These specific terms may be replaced with other terms within the scope and spirit of the present invention.

In some instances, to prevent the concept of the present invention from being ambiguous, structures and apparatuses of the known art will be omitted, or will be shown in block diagram form based on main functions of each structure and apparatus. In addition, wherever possible, like reference numerals denote the same parts throughout the drawings and the specification.

The embodiments of the present invention can be supported by standard documents disclosed for at least one of wireless access systems including Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by these specifications. Further, all terms as set forth herein can be explained by the standard specifications.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile. Telecommunications System (UMTS). 3GPP LTE is a part of Evolved UMTS (E-UMTS) using E-UTRA. 3GPP LTE employs OFDMA for Downlink (DL) and SC-FDMA for Uplink (UL). LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, the present disclosure focuses on the 3GPP LTE and LTE-A systems. However, the technical features of the present invention are not limited thereto.

A description is now given of the structure of a radio frame in the 3GPP LTE system with reference to FIG. 1.

In a cellular Orthogonal Frequency Division Multiplexing (OFDM) wireless packet communication system, UL/DL data packets are transmitted on a subframe basis and a subframe is defined as a certain time period including a plurality of OFDM symbols. The 3GPP LTE standard supports a type-I radio frame structure applicable to Frequency Division Duplex (FDD) and a type-2 radio frame structure applicable to Time Division Duplex (TDD).

FIG. 1(a) is a view illustrating the type-1 radio frame structure. A radio frame includes 10 subframes and a subframe includes two slots in the time domain. A time taken to transmit a subframe is defined as a Transmission Time Interval (TTI). For example, the length of a subframe may be 1 ms and the length of a slot may be 0.5 ms. A slot includes a plurality of OFDM symbols in the time domain and a plurality of Resource Blocks (RBs) in the frequency domain. Since the 3GPP LTE system uses OFDMA for downlink, an OFDM symbol represents a symbol period. An OFDM symbol may also be referred to as an SC-FDMA symbol or a symbol period. An RB is a resource allocation unit and a slot may include a plurality of contiguous subcarriers.

The number of OFDM symbols included in a slot may vary depending on the configuration of a Cyclic Prefix (CP). There are two types of CPs: an extended CP and a normal CP. In the case of the normal CP, a slot may include 7 OFDM symbols. In the case of the extended CP, the length of an OFDM symbol is increased and thus the number of OFDM symbols included in a slot is smaller than in the case of the normal CP. When the extended CP is used, for example, 6 OFDM symbols may be included in a slot. In an instable channel state, for example, when a UE moves fast, the extended CP may be used to further decrease Inter-Symbol Interference (ISI).

FIG. 1(b) is a view illustrating the type-2 radio frame structure. The type-2 radio frame includes 2 half frames each including 5 subframes, a Downlink Pilot Time Slot (DwPTS), a Guard Period (GP) and an Uplink Pilot Time Slot (UpPTS). A subframe includes 2 slots. The DwPTS is used for initial cell search, synchronization or channel estimation at a UE. The UpPTS is used for channel estimation and acquisition of UL transmission synchronization to a UE at an eNB. The GP is a period between UL and DL, which eliminates UL interference caused by multipath delay of a DL signal. 1 subframe includes 2 slots irrespective of the radio frame type.

The above-described radio frame structures are purely exemplary and the number of subframes included in a radio frame, the number of slots included in a subframe, or the number of symbols included in a slot may vary.

Figure 2:
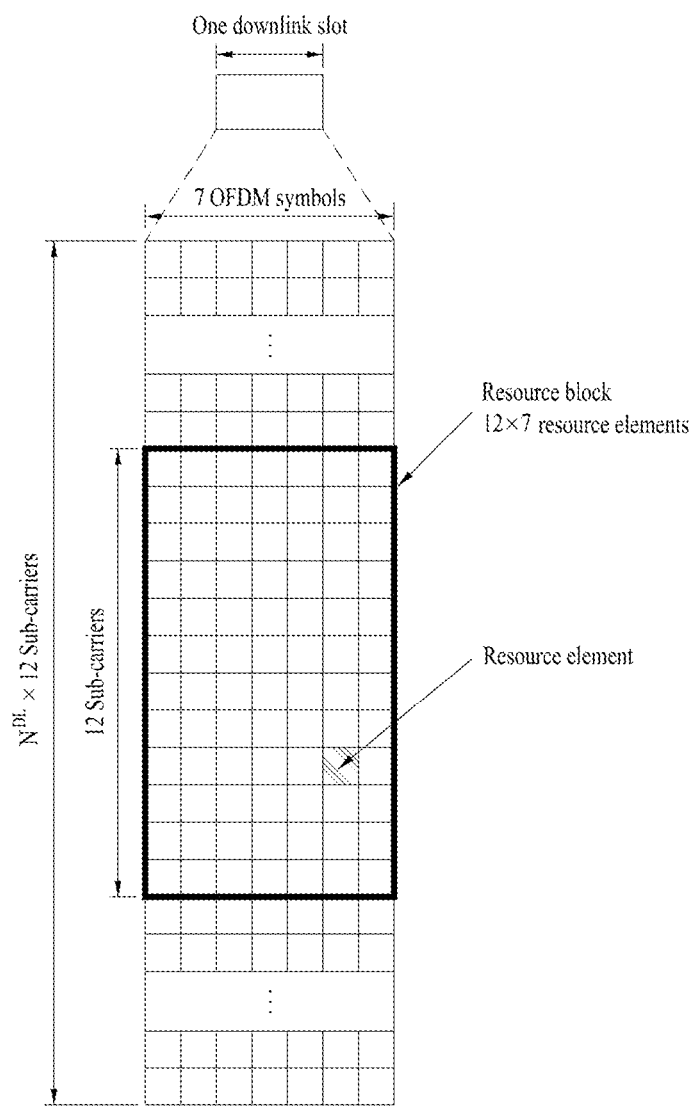
FIG. 2 is a view illustrating a resource grid.

FIG. 2 is a view illustrating a resource grid for a DL slot. A DL slot may include 7 OFDM symbols in the time domain and an RB may include 12 subcarriers in the frequency domain. However, the present invention is not limited thereto. For example, a slot may include 7 OFDM symbols in the case of a normal CP but may include 6 OFDM symbols in the case of an extended CP. Each element of the resource grid is referred to as a Resource Element (RE). An RB includes 12×7 REs. The number of RBs included in a DL slot, $N^{DL}$ depends on a DL transmission bandwidth. The structure of a UL slot may be the same as that of the DL slot.

Downlink Subframe Structure

Figure 3:
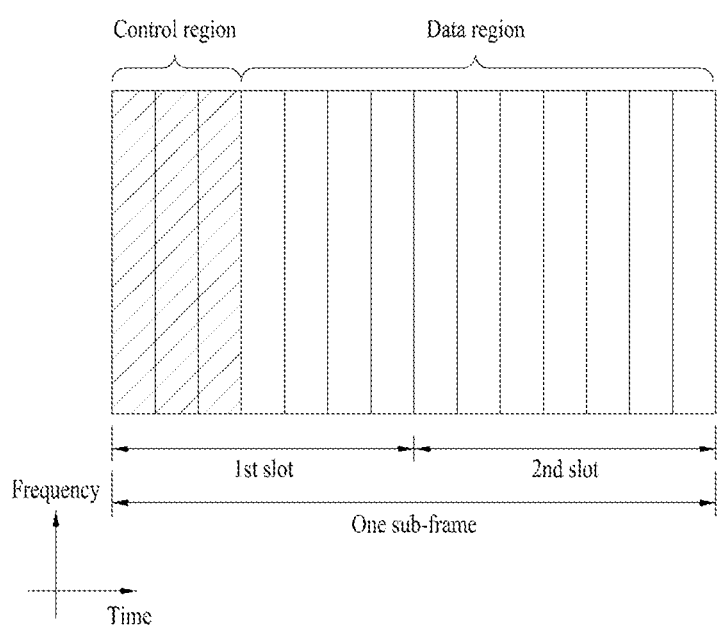
FIG. 3 is a view illustrating the structure of a downlink subframe.

FIG. 3 is a view illustrating the structure of a DL subframe. Up to 3 initial OFDM symbols of the first slot in a DL subframe correspond to a control region to which control channels are allocated and the other OFDM symbols of the DL subframe correspond to a data region to which a Physical Downlink Shared Chancel (PDSCH) is allocated. DL control channels used in the 3GPP LTE system include, for example, a Physical Control Format Indicator Channel (PCFICH), a Physical Downlink Control Channel (PDCCH) and a Physical Hybrid automatic repeat request (HARQ) Indicator Channel (PHICH). The PCFICH is transmitted using the first OFDM symbol of a subframe and carries information about the number of OFDM symbols used for control channel transmission in the subframe. The PHICH carries an HARQ ACKnowledgment/Negative ACKnowledgment (ACK/NACK) signal as a response to UL transmission. Control information transmitted on the PDCCH is referred to as Downlink Control Information (DCI). The DCI includes UL or DL scheduling information, or UL Tx power control commands for an arbitrary UE group. The PDCCH may carry resource allocation and transmission format information of a Downlink Shared Channel (DL-SCH), resource allocation information of an Uplink Shared Channel (UL-SCH), paging information of a Paging Channel (PCH), system information on the DL-SCH, resource allocation information of a higher-layer control message such as a random access response transmitted on the PDSCH, a set of Tx power control commands for individual UEs within an arbitrary UE group, Tx power control information, Voice over Internet Protocol (VoIP) enable information, etc. A plurality of PDCCHs may be transmitted in the control region. A UE may monitor a plurality of PDCCHs. A PDCCH is transmitted in an aggregation of one or more consecutive Control Channel Elements (CCEs). A CCE is a logical allocation unit used to provide a PDCCH at a coding rate based on the state of a radio channel. A CCE corresponds to a plurality of RE Groups (REGs). The format and number of available bits of a PDCCH are determined based on the correlation between the number of CCEs and a coding rate provided by the CCEs. An eNB determines a PDCCH format based on DCI transmitted to a UE and adds a Cyclic Redundancy Check (CRC) to the control information. The CRC is masked with an Identifier (ID) such as a Radio Network Temporary Identifier (RNTI) based on the owner or purpose of the PDCCH. If the PDCCH is for a specific UE, the CRC may be masked with a Cell-RNTI (C-RNTI) of the UE. Otherwise, if the PDCCH is for a paging message, the CRC may be masked with a Paging Indicator Identifier (P-RNTI). If the PDCCH is for system information and, more particularly, a System Information Block (SIB), the CRC may be masked with a system information ID and a System Information RNTI (SI-RNTI). To indicate a random access response to a random access preamble transmitted by a UE, the CRC may be masked with a Random Access-RNTI (RA-RNTI).

Downlink Reference Signal

Since packets are transmitted through a radio channel in a wireless communication system, a signal may be distorted during transmission. A receiver should correct the distorted signal using channel information in order to correctly receive the distorted signal. To detect channel information, a signal known to both the receiver and a transmitter is transmitted and the channel information is detected using a degree of distortion of the signal when the signal is received on a channel. This signal is referred to as a pilot signal or a Reference Signal (RS).

When multiple antennas are used to transmit and receive data, a correct signal can be received only when a channel state between each Tx antenna and each Rx antenna is detected. Accordingly, an RS is required for each Tx antenna.

There are two types of downlink reference signals: a Common Reference Signal (CRS) shared by all UEs in a cell and a Dedicated Reference Signal (DRS) dedicated to a specific UE. Information for channel estimation and demodulation can be provided by these RSs. The CRS is used to estimate a channel of a physical antenna and can be commonly received by all UEs in a cell. The CRS is distributed over the entire band. The CRS can be used for Channel State Information (CSI) acquisition and data demodulation.

A receiver (UE) can estimate a channel state based on the CRS and feed back an indicator associated with channel quality, e.g., Channel Quality Indicator (COI), Precoding Matrix Index (PMI) and/or Rank Indicator (RI), to a transmitter (eNB). The CRS may also be referred to as a cell-specific RS.

The DRS can be transmitted through a corresponding RE when data on a PDSCH needs to be demodulated. Presence or absence of the DRS may be signaled to the UE from a higher layer, or a fact that the DRS is valid only when a corresponding PDSCH is mapped may be signaled to the UE. The DRS may also be referred to as a UE-specific RS or a Demodulation Reference Signal (DMRS). The DRS (or a UE-specific RS) is used for data demodulation. For transmission through multiple antennas, a precoding weight used for a specific UE is equally applied to RSs such that, when the UE receives the RSs, it may estimate equivalent channels in which the precoding weight applied to the respective Tx antennas are combined with transmission channels.

Figure 4:
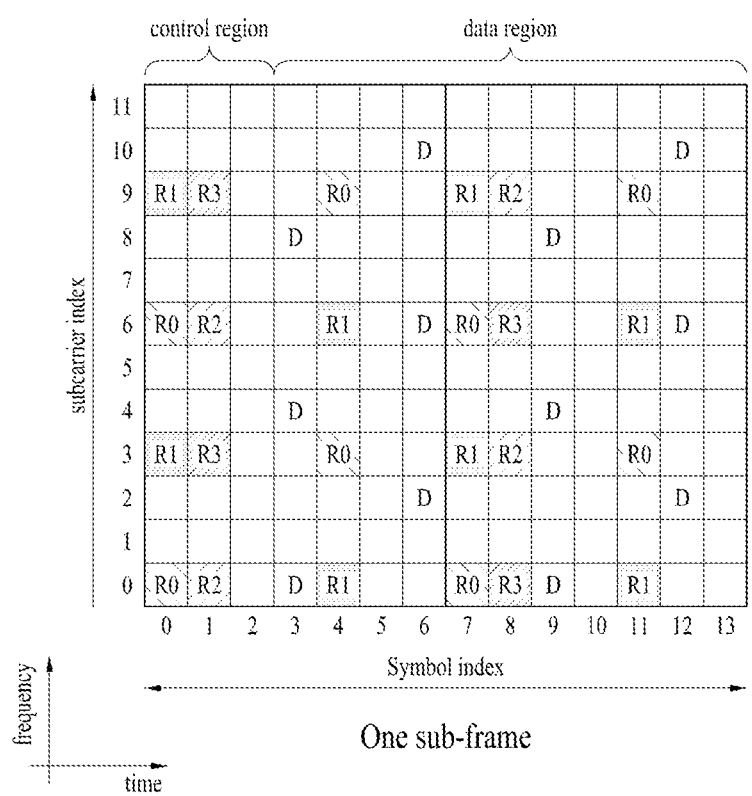
FIG. 4 is a view for describing a downlink reference signal.

FIG. 4 is a view illustrating a pattern of mapping a CRS and a DRS defined in 3GPP LTE (e.g., Release-8) to a downlink RB pair. A downlink RB pair is a reference signal mapping unit and may be represented as 1 subframe in the time domain×12 subcarriers in the frequency domain. That is, an RB pair has a length of 14 OFDM symbols in the case of a normal CP and has a length of 12 OFDM symbols in the case of an extended CP in the time domain. FIG. 4 illustrates the RB pair in the case of the normal CP.

FIG. 4 illustrates RS positions in RB pairs in a system in which an eNB supports 4 Tx antennas. In FIG. 4, REs marked 'R0', 'R2' and 'R3' respectively represent CRS positions with respect to antenna port indices 0, 1, 2 and 3. An RE marked 'D' represents a DRS position.

LTE-A evolving from 3GPP LTE, considers high-order Multiple Input Multiple Output (MIMO), multi-cell transmission, enhanced multi-user (MU)-MIMO, etc. and also considers DRS based data demodulation to support efficient RS operation and enhanced transmission scheme. That is, separately from a DRS (antenna port index 5) for rank-1 beamforming, which is defined in 3GPP LTE (e.g., Release-8), a DRS (or UE-specific RS or DMRS) for two or more layers can be defined to support data transmission through an added antenna. For example, UE-specific RS ports supporting up to 8 Tx antenna ports can be defined with antenna port numbers 7 to 12 and the UE-specific RS can be transmitted at an RE position which does not overlap with other RSs.

In LTE-A, an RS associated with feedback of CSI such as CQI/PMI/RI for a new antenna port may be separately defined as a CSI-RS. For example, CSI-RS ports supporting up to 8 Tx antenna ports can be defined with antenna port numbers 15 to 22 and the CIS-RS can be transmitted at an RE position which does not overlap with other RSs.

When data is transmitted on a certain downlink subframe (e.g., PDSCH transmission), a DM RS is transmitted dedicatedly to a UE scheduled for data transmission. A DM RS dedicated to a specific UE (or a UE-specific RS) may be designed to be transmitted only in a resource region scheduled for the UE, i.e., only in a time-frequency domain in which data for the UE is transmitted.

The UE-specific RS may be transmitted through an antenna port p=7, p=8, or p=7, 8, . . . , v+6, where v denotes the number of layers used for PDSCH transmission.

A UE-specific RS sequence r(m) may be defined as shown in Equation 1.

$$r(m) = \frac{1}{\sqrt{2}}(1 - 2 \cdot c(2m)) + j\frac{1}{\sqrt{2}}(1 - 2 \cdot c(2m+1))$$ [Equation 1]

In Equation 1, m=0, 1, . . . , $12N_{RB}^{max,DL}-1$ is defined for a normal CP and m=0, 1, . . . , 0, 1, . . . , $16N_{RB}^{max,DL}-1$ is defined for an extended CP.

In Equation 1, a pseudo-random sequence c(i) is defined as shown in Equation 8. A pseudo-random sequence generator is initialized to $c_{init}$ as shown in Equation 2 at the beginning of each radio frame.

$$c_{init}=(\lfloor n_s/2 \rfloor+1)\cdot(2N_{ID}^{cell}+1)\cdot 2^{16}+n_{SCID}$$ [Equation 2]

In Equation 2, $n_{SCID}$ is basically configured to 0, and can be configured to a value of 0 or 1 depending on the value of a scrambling identity field within a DCI format.

Unlike that a CRS of the legacy LTE system is used for channel measurement, handover measurement and data demodulation, a CSI-RS is designed mainly for channel measurement. The CSI-RS can also be used for handover measurement. Since the CSI-RS is transmitted only to acquire information about a channel state, the CSI-RS may not be transmitted in every subframe unlike the CRS of the legacy LTE system. Accordingly, the CSI-RS may be intermittently (e.g., periodically) transmitted in the time domain to reduce CSI-RS overhead.

The CSI-RS can be transmitted using 1, 2, 4 or 8 antenna port, e.g., antenna port p=15, p=15, 16, p=15, . . . , 18 and p=15, . . . , 22.

A CSI-RS sequence $r_{l,n_s}(m)$ may be defined as shown in Equation 3.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 3]
$$m = 0, 1, \ldots, N_{RB}^{max,DL}-1$$

In Equation 3, $n_s$ denotes a slot number in a radio frame, and l denotes an OFDM symbol number in a corresponding slot. The pseudo-random sequence c(i) is defined as shown in Equation 8. A pseudo-random sequence generator is initialized to $c_{init}$ as shown in Equation 4 at the beginning of each radio frame.

$$c_{init}=2^{10}\cdot(7\cdot(n_s+1)+l+1)\cdot(2\cdot N_{ID}^{cell}+1)+2\cdot N_{ID}^{cell}+N_{CP}$$ [Equation 4]

In Equation 4, $N_{CP}$ is defined as 1 for a normal CP and 0 for an extended CP.

Uplink Subframe Structure

Figure 5:
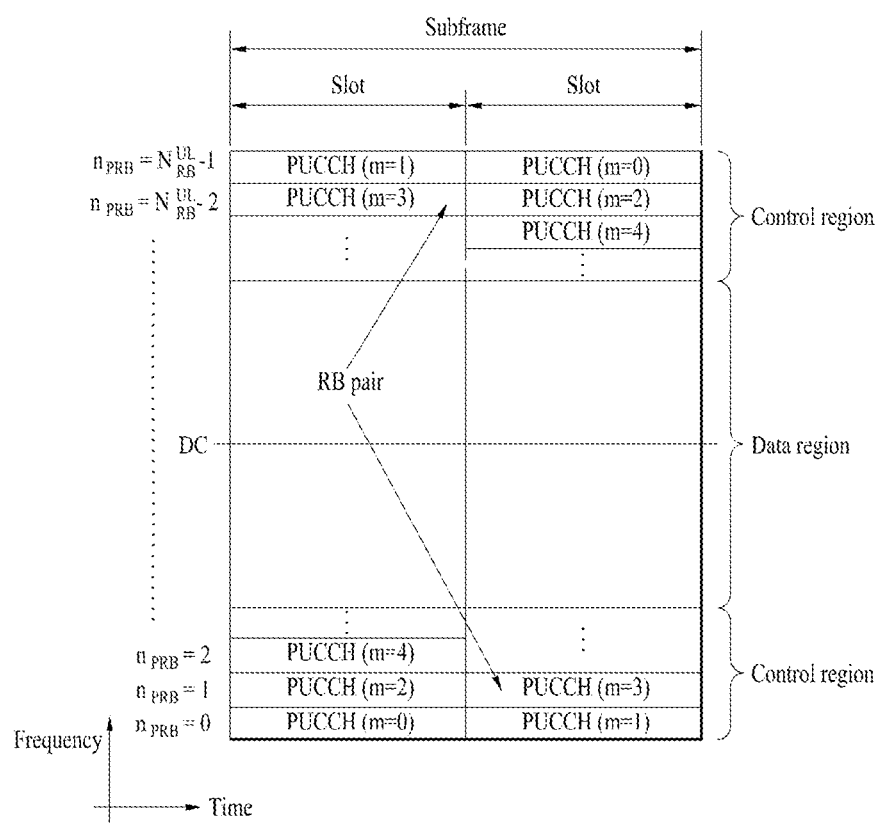
FIG. 5 is a view illustrating the structure of an uplink subframe.

FIG. 5 is a view illustrating the structure of a UL subframe.

Referring to FIG. 5, a UL subframe can be divided into a control region and a data region in the frequency domain. One or more Physical Uplink Control Channels (PUCCHs) can be allocated to the control region to carry Uplink Control Information (UCI). One or more Physical Uplink Shared Channels (PUSCHs) may be allocated to the data region of the UL subframe to carry user data.

In the UL subframe, subcarriers away from a Direct Current (DC) subcarrier are used as the control region. In other words, subcarriers located at two ends of a UL transmission bandwidth are assigned to UCI transmission. The DC subcarrier is a remaining component not used for signal transmission and is mapped to carrier frequency f0 during frequency up-conversion. A PUCCH for a single UE is allocated to resources operating at a carrier frequency in a subframe and RBs belonging to the RB pair occupy different subcarriers in two slots. Assignment of the PUCCH in this manner is represented as frequency hopping of an RB pair allocated to the PUCCH at a slot boundary. When frequency hopping is not used, the RB pair occupies the same subcarrier.

The PUCCH can be used to transmit the following control information.

Scheduling Request (SR): Information used to request a UL-SCH resource and is transmitted using On-Off Keying (OOK) scheme.

HARQ-ACK: Response to a PDCCH and/or a downlink data packet (e.g., codeword) on a PDSCH and indicates whether the PDCCH or PDSCH has been successfully received. A 1-bit HARQ-ACK signal is transmitted as a response to a single downlink codeword and a 2-bit HARQ-ACK signal is transmitted as a response to two downlink codewords. The HARQ-ACK response includes positive ACK (simply, ACK), negative ACK (NACK), Discontinuous Transmission (DTX) or NACK/DTX. Here, the term HARQ-ACK is used interchangeably with the terms HARQ ACK/NACK and ACK/NACK.

Channel State Information (CSI): Feedback information about a downlink channel. Multiple Input Multiple Output (MIMO)-related feedback information includes a Rank Indicator (RI) and a Precoding Matrix Indicator (PMI).

The amount of Uplink Control Information (UCI) that a UE can transmit in a subframe depends on the number of SC-FDMA symbols available for control information transmission. The SC-FDMA symbols available for control information transmission refer to SC-FDMA symbols other than SC-FDMA symbols for reference signal transmission in the subframe. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports various formats base on information transmitted thereon.

Briefly, PUCCH format 1 is used to transmit an SR, PUCCH format 1a/1b is used to transmit ACK/NACK information, PUCCH format 2 is used to deliver CSI such as CQI/PMI/RI, PUCCH format 2a/2b is used to deliver ACK/NACK information together with CSI, and PUCCH format 3 series is used to transmit ACK/NACK information UCI Transmission FIGS. 6 to 10 illustrate UCI transmission using PUCCH format 1 series, PUCCH format 2 series and PUCCH format 3 series.

In the 3GPP LTE/LTE-A system, a subframe having a normal CP includes 2 slots each including 7 OFDM symbols (or SC-FDMA symbols). A subframe having an extended CP includes 2 slots each including 6 OFDM symbols (or SC-FDMA symbols). Since the number of OFDM symbols (or SC-FDMA symbols) per a subframe varies depends on a CP length, a PUCCH transmission structure in a UL subframe varies depending on the CP length. Accordingly, a method for transmitting UCI in a UL subframe by a UE varies depending on a PUCCH format and a CP length.

Figure 6:
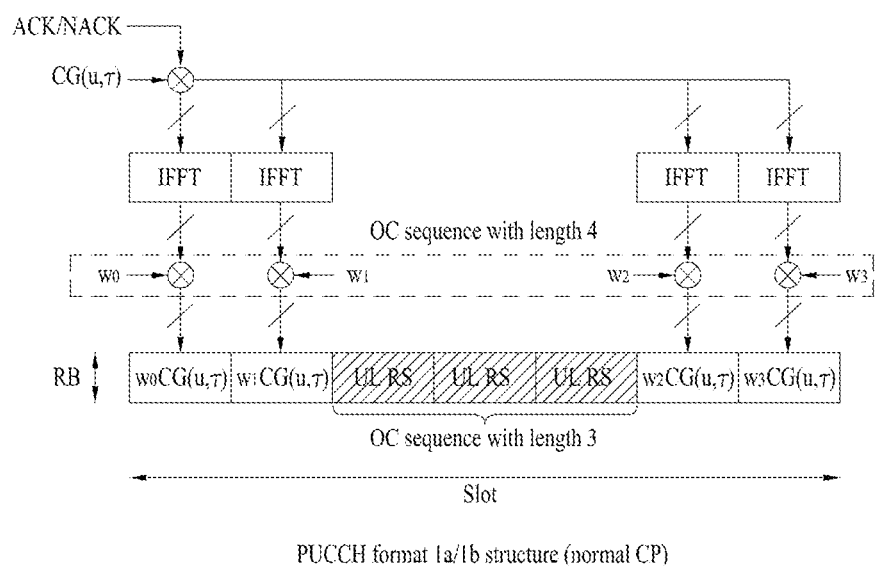
FIGS. 6 to 10 illustrate Uplink Control Information (UCI) transmission using Physical Uplink Control Channel (PUCCH) format 1 series, PUCCH format 2 series and PUCCH format 3 series.
Figure 7:
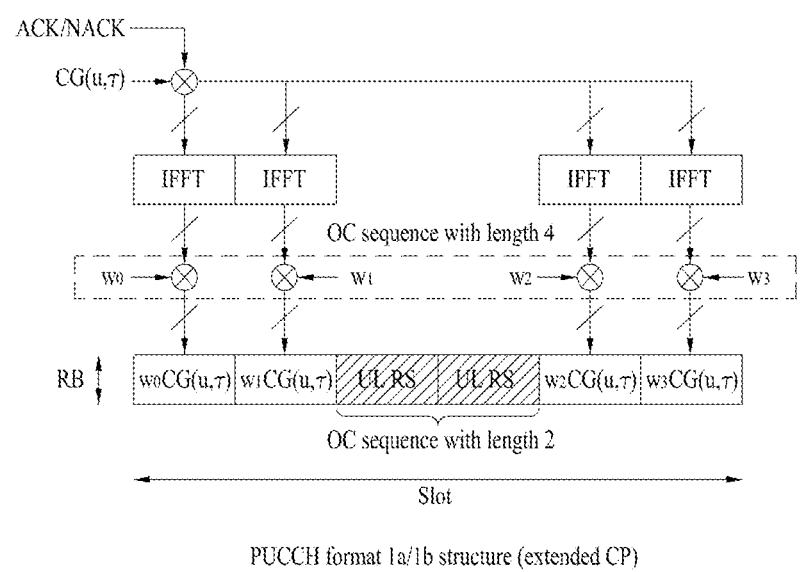

Referring to FIGS. 6 and 7, in case of transmission using PUCCH formats 1a and 1b, the same control information is repeated on a slot basis in a subframe. UEs transmit ACK/NACK signals using different resources having different cyclic shifts (CSs) of a Computer-Generated Constant Amplitude Zero Auto Correlation (CG-CAZAC) sequence and an Orthogonal Cover Code (OCC). A CS may correspond to a frequency domain code and an OCC may correspond to a time domain spreading code. An OCC may also be referred to as an orthogonal sequence. An OCC includes, for example, a Walsh/Discrete Fourier Transform (DFT) orthogonal code. When the number of CSs is 6 and the number of OCCs is 3, a total of 18 PUCCHs can be multiplexed in the same Physical Resource Block (PRB) on the basis of a single antenna port. An orthogonal sequence of $w_0$, $w_1$, $w_2$ and $w_3$ may be used in an arbitrary time domain after Fast Fourier Transform (FFT) or in an arbitrary frequency domain before FFT. A PUCCH resource for ACK/NACK transmission in the 3GPP LTE/LTE-A system is represented as a combination of the position of a time-frequency resource (e.g., PRB), a cyclic shift of a sequence for frequency spreading and an orthogonal code (or quasi-orthogonal code) for time spreading. Each PUCCH resource is indicated using a PUCCH resource index (also referred to as a PUCCH index). A slot level structure of PUCCH format 1 series for SR transmission is the same as that of PUCCH formats 1a and 1b while only modulation methods thereof are different.

Figure 8:
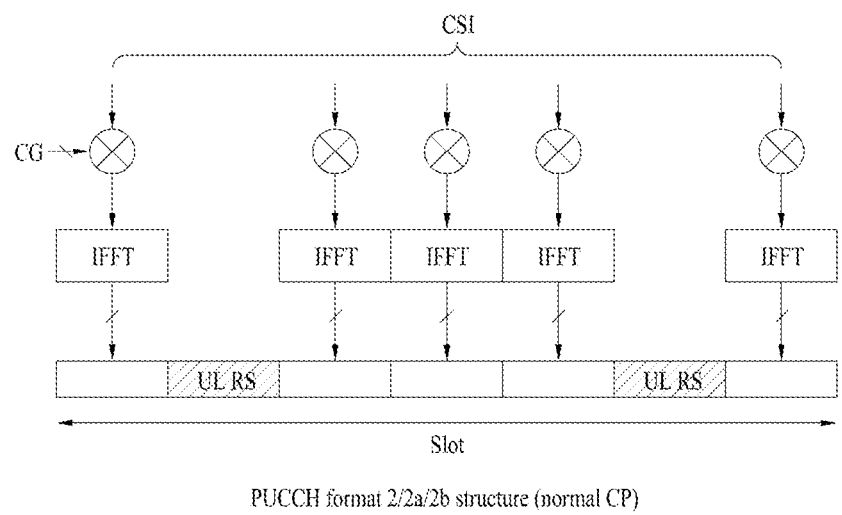
Figure 9:
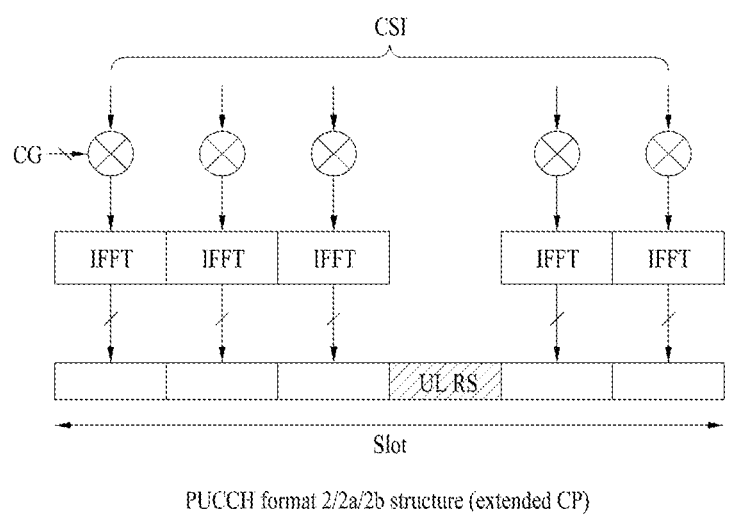

FIG. 8 illustrates transmission of CSI in a UL slot having a normal CP using PUCCH format 2a/2b/2c and FIG. 9 illustrates transmission of CSI in a UL slot having an extended CP using PUCCH format 2a/2b/2c.

Referring to FIGS. 8 and 9, in case of the normal CP, a UL subframe includes 10 SC-FDMA symbols excluding symbols carrying UL RSs. The CSI is coded into 10 transmission symbols (also referred to as complex-valued modulation symbols) through block coding. The 10 transmission symbols are respectively mapped to 10 SC-FDMA symbols and transmitted to an eNB.

PUCCH format 1/1a/1b and PUCCH format 2/2a/2b can carry UCI up to a certain number of bits. However, as the amount of UCI is increased due to use of carrier aggregation, increase in the number of antennas and adoption of a TDD system, a relay system and a multi-node system, a PUCCH format capable of carrying a larger amount of UCI than PUCCH formats 1/1a/1b/2/2a/2b has been adopted and this format is referred to as PUCCH format 3. For example, PUCCH format 3 can be used when a UE for which carrier aggregation is configured transmits a plurality of ACK/NACK signals in response to a plurality of PDSCHs received from an eNB through a plurality of downlink carriers, through a specific uplink carrier.

Figure 10:
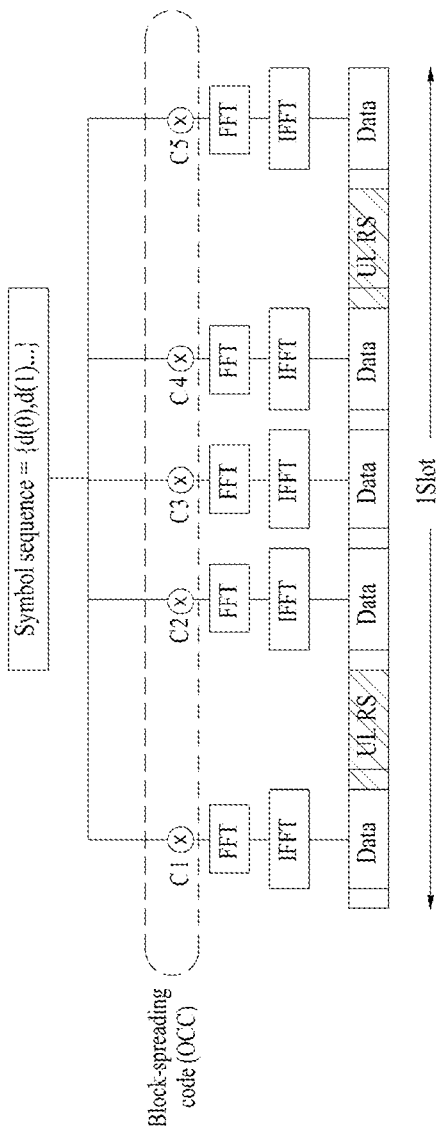

PUCCH format 3 may be configured based on, for example, block spreading. Referring to FIG. 10, block spreading time-domain-spreads a symbol sequence using an OCC (or orthogonal sequence) and transmits the spread symbol sequence. Using block spreading, control signals of a plurality of UEs can be multiplexed to the same RB due to the OCC and transmitted to an eNB. In the case of PUCCH format 2, a symbol sequence is transmitted over the time domain, and UCI of UEs are multiplexed using a CS of a CAZAC sequence and transmitted to an eNB. On the other hand, in the case of the new PUCCH format (e.g., PUCCH format 3) based on block spreading, a symbol sequence is transmitted over the frequency domain, and UCI of UEs are multiplexed using OCC based time-domain spreading and transmitted to the eNB. For example, referring to FIG. 8, a symbol sequence is spread using a length-5 (i.e., SF-5) OCC and mapped to 5 SC-FDMA symbols. Although FIG. 10 illustrates a case in which a total of 2 RS symbols are used in 1 slot, 3 RS symbols may be used and an OCC with SF-4 can be used for symbol sequence spreading and UE multiplexing. Here, the RS symbols can be generated from a CAZAC sequence having a specific CS and transmitted from the UE to the eNB after a specific OCC is applied thereto/ multiplied thereby. In FIG. 10, DFT may be previously used prior to the OCC, and Fast Fourier Transform (FFT) may be used instead of DFT.

In FIGS. 6 to 10, a UL RS transmitted together with UCI on a PUCCH can be used to demodulate the UCI by the eNB.

Figure 11:
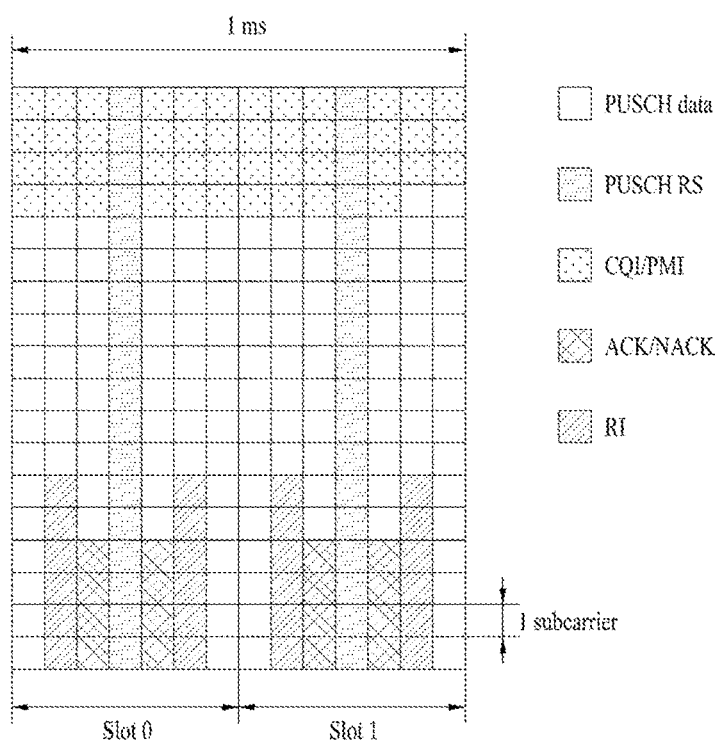
FIG. 11 illustrates multiplexing of UCI and uplink data in a Physical Uplink Shared Channel (PUSCH) region.

FIG. 11 illustrates multiplexing of UCI and uplink data in a PUSCH region.

The uplink data can be transmitted in a data region of a UL subframe through a PUSCH. A UL DMRS which is a reference signal for demodulation of the uplink data can be transmitted together with the uplink data in the data region of the UL subframe. The control region and the data region in the UL subframe are respectively referred to as a PUCCH region and a PUSCH region.

When UCI needs to be transmitted in a subframe to which PUSCH transmission is assigned, as long as simultaneous transmission of the PUSCH and a PUCCH is not allowed, a UE multiplexes the UCI and uplink data (hereinafter referred to as PUSCH data) before DFT-spreading and transmits the multiplexed UL signal on a PUSCH. The UCI includes at least one of CQI/PMI, HARQ ACK/NACK and RI. The number of REs used for CQI/PMI, HARQ ACK/NACK or RI transmission is based on a Modulation and Coding Scheme (MCS) and an offset value ($\Delta_{offset}^{CQI}$, $\Delta_{offset}^{HARQ-ACK}$, $\Delta_{offset}^{RI}$) allocated for PUSCH transmission. The offset value allows different coding rates based on the UCI and is semi-statically configured through higher layer (e.g., Radio Resource Control (RRC)) signaling. The PUSCH data and the UCI are not mapped to the same RE. The UCI is mapped to be present in both slots of the subframe.

Referring to FIG. 11, CQI and/or PMI resources are located at the start of PUSCH data resources and sequentially mapped to all SC-FDMA symbols in a subcarrier and then to a next subcarrier. The CQI/PMI is mapped from left to right within a subcarrier, i.e., in a direction in which the SC-FDMA symbol index increases. The PUSCH data is rate-matched in consideration of the amount of CQI/PMI resources (i.e., the number of coded symbols). The same modulation order as that of UL-SCH data is used for the CQI/PMI. An ACK/NACK signal is punctured into a part of SC-FDMA resources to which the UL-SCH data is mapped. The ACK/NACK signal is located adjacent to a PUSCH RS which is a reference signal for demodulation of the PUSCH data, and is filled from bottom to top within corresponding SC-FDMA symbols, i.e., in a direction in which the subcarrier index increases. In the case of a normal CP, SC-FDMA symbols for the ACK/NACK signal are located at SC-FDMA symbols #2/#5 in each slot as illustrated in FIG. 11. The coded RI is located adjacent to the symbols for the ACK/NACK signal irrespective of whether the ACK/NACK signal is actually transmitted in the subframe.

In 3GPP LTE, UCI may be scheduled to be transmitted on a PUSCH without PUSCH data. Multiplexing of ACK/NACK, RI and CQI/PMI is similar to that illustrated in FIG. 11. Channel coding and rate matching for control signaling without PUSCH data are the same as those for control signaling with PUSCH data, which are described above.

In FIG. 11, the PUSCH RS can be used to demodulate the UCI and/or the PUSCH data transmitted in the PUSCH region. In the present invention, a UL RS associated with PUCCH transmission and a PUSCH RS associated with PUSCH transmission are collectively referred to as a DMRS.

A Sounding Reference Signal (SRS) (not shown) may be allocated to the PUSCH region. The SRS is a UL RS not associated with transmission of a PUSCH or PUCCH. The SRS is transmitted on the last SC-FDMA symbol of a UL subframe in the time domain and in a data transmission band, i.e., a PUSCH region, of the UL subframe in the frequency domain. An eNB can measure an uplink channel state between a UE and the eNB using the SRS. SRSs of a plurality of UEs, which are transmitted/received on the last SC-FDMA symbol of the same subframe, can be distinguished depending on frequency positions/sequences thereof.

Uplink Reference Signal

A DM RS transmitted in a PUCCH region and a DM RS and an SRS transmitted in a PUSCH region are UE-specifically generated by a specific UE and transmitted to an eNB and thus can be regarded as uplink UE-specific RSs.

A UL RS is defined based on a cyclic shift of a base sequence according to a predetermined rule. For example, an RS sequence $r_{u,v}^{(\alpha)}(n)$ is defined based on a cyclic shift $\alpha$ of a base sequence $r_{u,v}(n)$ as shown in Equation 5.

$$r_{u,v}^{(\alpha)}(n) = e^{j\alpha n} \cdot r_{u,v}(n), \; 0 \leq n < M_{sc}^{RS} \quad \text{[Equation 5]}$$

Here, $M_{sc}^{RS}$ denotes the length of an RS sequence, $M_{sc}^{RS} = m \cdot N_{sc}^{RB}$ and $1 \leq m \leq N_{RB}^{max,UL}$. $N_{RB}^{max,UL}$ represented as a multiple of $N_{sc}^{RB}$ by an integer denotes the largest uplink bandwidth configuration. $N_{sc}^{RB}$ denotes the size of an RB and is represented as the number of subcarriers. A plurality of RS sequences can be defined from a base sequence through different cyclic shift values $\alpha$. A plurality of base sequences is defined for a DM RS and an SRS. For example, the base sequences may be defined using a root Zadoff-Chu sequence. Base sequences $r_{u,v}(n)$ are divided into groups each including one or more base sequences. For example, each base sequence group can include one base sequence (v=0) having a length of $M_{sc}^{RS} = m \cdot N_{sc}^{RB}$ ($1 \leq m \leq 5$) and two base sequences having a length of $M_{sc}^{RS} = m \cdot N_{sc}^{RB}$ ($6 \leq m \leq N^{RB}$). In $r_{u,v}(n)$, $u \in \{0, 1, \ldots, 29\}$ denotes a group number (i.e., group index) and v denotes a base sequence number (i.e., base sequence index) in a corresponding group. Each of the base sequence group number and the base sequence number in the corresponding group may vary upon time.

The sequence group number u in slot $n_s$ is defined based on a group hopping pattern $f_{gh}(n_s)$ and a sequence shift pattern $f_{ss}$ as shown in Equation 6.

$$u = (f_{gh}(n_s) + f_{ss}) \bmod 30 \quad \text{[Equation 6]}$$

In Equation 6, mod denotes a modulo operation, and A mod B denotes a remainder obtained by dividing A by B.

There are a plurality of different hopping patterns (e.g., 30 hopping patterns) and a plurality of different sequence shift patterns (e.g., 17 sequence shift patterns). Sequence group hopping may be enabled or disabled by a cell-specific parameter given from a higher layer.

The group hopping pattern $f_{gh}(n_s)$ for a PUSCH and a PUCCH may be given as shown in Equation 7.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Equation 7]}$$

Here, a pseudo-random sequence c(i) can be defined based on a length-31 gold sequence. An output sequence c(n) (n=0, 1, ..., $M_{PN}-1$) having a length of $M_{PN}$ is defined as shown in Equation 8.

$$c(n)=(x_1(n+N_C)+x_2(n+N_C))\bmod 2$$

$$x_1(n+31)=(x_1(n+3)+x_1(n))\bmod 2$$

$$x_2(n+31)_2(n+3)+x_2(n+2)+x_2(n+1)+x_2(n))\bmod 2 \quad \text{[Equation 8]}$$

Here, $N_C=1600$ and a first m-sequence is initialized to $x_1(0)=1$, $x_1(n)=0$, $n=1, 2, \ldots, 30$. Initialization of a second m-sequence is represented as shown in Equation 9 having a value which is dependent upon application of the sequence.

$$c_{init}=\Sigma_{i=0}^{30}x_2(i)\cdot 2^i \quad \text{[Equation 9]}$$

In Equation 7, a pseudo-random sequence generator is initialized to $c_{init}$ as shown in Equation 10 at the beginning of each radio frame.

$$c_{init}=\left\lfloor\frac{N_{ID}^{cell}}{30}\right\rfloor \quad \text{[Equation 10]}$$

In Equation 10, $\lfloor\ \rfloor$ denotes a floor operation and $\lfloor A\rfloor$ is a maximum integer less than or equal to A.

According to the current 3GPP LTE(-A) standard, a PUCCH and a PUSCH have the same group hopping pattern as shown in Equation 7 but have different sequence shift patterns. A sequence shift pattern $f_{ss}^{PUCCH}$ for the PUCCH is given based on cell identity (cell ID) as shown in Equation 11.

$$f_{ss}^{PUCCH}=N_{ID}^{cell}\bmod 30 \quad \text{[Equation 11]}$$

A sequence shift pattern $f_{ss}^{PUSCH}$ for the PUSCH is given as shown in Equation 12 using the sequence shift pattern $f_{ss}^{PUCCH}$ for the PUCCH and a value $\Delta_{ss}$ configured by a higher layer.

$$f_{ss}^{PUSCH}=(f_{ss}^{PUCCH}+\Delta_{ss})\bmod 30 \quad \text{[Equation 12]}$$

Here, $\Delta_{ss}\in\{0, 1, \ldots, 29\}$.

Base sequence hopping is applied only to RSs having a length of $M_{sc}^{RS}\geq 6N_{sc}^{RB}$. For RSs having a length of $M_{sc}^{RS}<6N^{RB}$, a base sequence number v in a base sequence group is given as v=0. For the RSs having a length of $M_{sc}^{RS}\geq 6N_{sc}^{RB}$, the base sequence number v in a base sequence group in slot $n_s$ is defined as $v=c(n_s)$ if group hopping is disabled and sequence hopping is enabled, and defined as v=0 otherwise. Here, a pseudo-random sequence c(i) is given as shown in Equation 8. A pseudo-random sequence generator is initialized to $c_{init}$ as shown in Equation 13 at the beginning of each radio frame.

$$c_{init}=\left\lfloor\frac{N_{ID}^{cell}}{30}\right\rfloor\cdot 2^5+f_{ss}^{PUSCH} \quad \text{[Equation 13]}$$

A sequence $r_{PUCCH}^{(p)}(\cdot)$ of a UL RS (hereinafter referred to as a PUCCH DM RS) in FIGS. 6 to 10 is given as shown in Equation 14.

$$r_{PUCCH}^{(p)}(m'N_{RS}^{PUCCH}M_{sc}^{RS}+mM_{sc}^{RS}+n)= \quad \text{[Equation 14]}$$
$$\frac{1}{\sqrt{P}}\bar{w}^{(p)}(m)z(m)r_{u,v}^{(\alpha\_p)}(n)$$

Here, $m=0, \ldots, N_{RS}^{PUCCH}-1$, $n=0, \ldots, M_{sc}^{RS}-1$, and $m'=0, 1$. $N_{RS}^{PUCCH}$ denotes the number of reference symbols per a slot for the PUCCH and P denotes the number of antenna ports used for PUCCH transmission. A sequence $r_{u,v}^{(\alpha\_p)}(n)$ is given as shown in Equation 5 having $M_{sc}^{RS}=12$, and a cyclic shift $\alpha\_p$ is determined based on a PUCCH format.

All PUCCH formats use a cell-specific CS, $n_{cs}^{cell}(n_s,l)$. $n_{cs}^{cell}(n_s,l)$ has a value based on a symbol number l and a slot number $n_s$ and is determined as $n_{cs}^{cell}(n_s,l)=\Sigma_{i=0}^{7}c(8N_{symb}^{UL}\cdot n_s+8l+i)\cdot 2^i$. Here a pseudo-random sequence c(i) is initialized to $c_{init}=N_{ID}^{cell}$ at the beginning of each radio frame.

For PUCCH formats 2a and 2B, z(m) is the same as d(10) if m=1, and z(m)=1 otherwise. For PUCCH formats 2a and 2b supported for a normal CP only, UCI information bits $b(20), \ldots, b(M_{bit}-1)$ among $b(0), \ldots, b(M_{bit}-1)$ are modulated into a single modulation symbol d(10) used to generate a reference signal for PUCCH formats 2a and 2b, as shown in Table 1.

TABLE 1

| PUCCH format | $b(20), \ldots, b(M_{bit}-1)$ | d(10) |
|---|---|---|
| 2a | 0 | 1 |
|  | 1 | −1 |
| 2b | 00 | 1 |
|  | 01 | −j |
|  | 10 | j |
|  | 11 | −1 |

The PUSCH RS (hereinafter referred to as a PUSCH DM RS) of FIG. 11 is transmitted on a layer basis. A PUSCH DM RS sequence $r_{PUSCH}^{(p)}(\cdot)$ associated with layer $\lambda\in\{0, 1, \ldots, v-1\}$ is given as shown in Equation 15.

$$r_{PUSCH}^{(\lambda)}(m\cdot M_{sc}^{RS}+n)=w^{(\lambda)}(m)r_{u,v}^{(\alpha\_\lambda)}(n) \quad \text{[Equation 15]}$$

Here, $m=0, 1$, $n=0, \ldots, M_{sc}^{RS}-1$, and $M_{sc}^{RS}=M_{sc}^{PUSCH}$. $M_{sc}^{PUSCH}$ is a bandwidth scheduled for uplink transmission and denotes the number of subcarriers. An orthogonal sequence $w^{(\lambda)}(m)$ can be given as shown in Table 2 using a cyclic shift field in the most recent uplink-related DCI for transport blocks associated with corresponding PUSCH transmission. Table 2 shows mapping of the cyclic shift field in the uplink-related DCI format to $n_{DMRS,\lambda}^{(2)}$ and $[w^{(\lambda)}(0)\ w^{(\lambda)}(1)]$.

TABLE 2

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |

TABLE 2-continued

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

A cyclic shift $\alpha\_\lambda$ in slot $n_s$ is given as $2\pi n_{cs,\lambda}/12$. Here, $n_{cs,\lambda}=(n_{DMRS}^{(1)}+n_{DMRS,\lambda}^{(2)}+n_{PN}(n_s))\bmod 12$. $n_{DMRS}^{(1)}$ is given as shown in Table 3 based on a cyclic shift parameter given through higher layer signaling. Table 3 shows mapping of cyclic shifts to $n_{DMRS}^{(1)}$ through higher layer signaling.

TABLE 3

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Moreover, $n_{PN}(n_s)$ is given as shown in Equation 16 using a cell-specific pseudo-random sequence c(i).

$$n_{PN}(n_s)=\Sigma_{i=0}^{7}c(8N_{symb}^{UL}\cdot n_s+i)\cdot 2^i \qquad \text{[Equation 16]}$$

Here, the pseudo-random sequence c(i) is defined as shown in Equation 8. A pseudo-random sequence generator is initialized to $c_{init}$ as shown in Equation 17 at the beginning of each radio frame.

$$c_{init} = \left\lfloor \frac{N_{ID}^{cell}}{30} \right\rfloor \cdot 2^5 + f_{ss}^{PUSCH} \qquad \text{[Equation 17]}$$

An SRS sequence $r_{SRS}^{(p)}(n)=r_{u,v}^{(\alpha\_p)}(n)$ is defined as shown in Equation 5. Here, u denotes the PUCCH sequence group number described above in relation to group hopping and v denotes the base sequence number described above in relation to sequence hopping. A cyclic shift $\alpha\_p$ of the SRS is given as shown in Equation 18.

$$\alpha_p = 2\pi \frac{n_{SRS}^{cs,p}}{8} \qquad \text{[Equation 18]}$$

$$n_{SRS}^{cs,p} = \left(n_{SRS}^{cs} + \frac{8p}{N_{ap}}\right)\bmod 8$$

$$p \in \{0, 1, \ldots, N_{ap} - 1\}$$

Here, $n_{SRS}^{cs}=\{0, 1, 2, 3, 4, 5, 6, 7\}$ is a value configured for each UE by higher layer parameters and configured by different higher layer parameters for periodic sounding and aperiodic sounding configurations. $N_{ap}$ denotes the number of antenna ports used for SRS transmission.

Coordinated Multi-Point (CoMP)

A CoMP transmission/reception scheme (also referred to as co-MIMO, collaborative MIMO or network MIMO) is proposed to meet enhanced system performance requirements of 3GPP LTE-A. CoMP can improve the performance of a UE located at a cell edge and increase an average sector throughput.

Generally, in a multi-cell environment having a frequency reuse factor of 1, the performance of a UE located at a cell edge and an average sector throughput may decrease due to inter-cell interference (ICI). To reduce ICI, the legacy LTE system uses a method for providing an appropriate throughput performance to a UE located at a cell edge in an environment restricted by interference, simply using a passive scheme such as fractional frequency reuse (FFR) through UE-specific power control. However, it may be more preferable to reduce ICI or reuse ICI as a signal desired by a UE rather than decreasing use of frequency resources per a cell. To achieve this, a CoMP transmission scheme can be used.

A CoMP scheme applicable to downlink can be largely classified into Joint Processing (JP) and Coordinated Scheduling/Coordinated Beamforming (CS/CB).

According to the JP scheme, each point (BS) of a CoMP coordination unit can use data. The CoMP coordination unit refers to a set of BSs used for a coordinated transmission scheme. The JP scheme can be classified into joint transmission and dynamic cell selection.

The joint transmission scheme refers to a scheme for transmitting PDSCHs simultaneously from a plurality of points (a part of or the whole CoMP coordination unit). That is, data directed to a single UE can be transmitted simultaneously from a plurality of transmission points. According to the joint transmission scheme, the quality of a received signal can be improved coherently or non-coherently and interference on other UEs can be actively eliminated.

The dynamic cell selection scheme refers to a scheme for transmitting a PDSCH from one point (of a CoMP coordination unit) at a time. That is, data directed to a single UE at a specific time is transmitted from one point and other points in the coordination unit do not transmit data to the UE at that time. The point which transmits the data to the UE can be dynamically selected.

According to the CS/CB scheme, CoMP coordination units can cooperatively perform beamforming of data transmission to a single UE. Here, data is transmitted only from a serving cell but user scheduling/beaming can be determined through coordination of cells of a corresponding CoMP coordination unit.

In case of uplink, coordinated multi-point reception refers to reception of a signal transmitted through coordination of a plurality of points geographically spaced apart from each other. A CoMP scheme applicable to uplink can be classified into Joint Reception (JR) and Coordinated Scheduling/Coordinated Beamforming (CS/CB).

The JR scheme refers to a scheme for receiving a PUSCH signal by a plurality of reception points and the CS/CB scheme refers to a scheme for receiving a PUSCH signal by a single point but determining user scheduling/beamforming through coordination of cells of a CoMP coordination unit.

Using a CoMP system, a UE can receive data cooperatively from multi-cell BSs. The BSs can simultaneously support one or more UEs using the same radio frequency resource to improve system performance. Moreover, a BS may perform Space Division Multiple Access (SDMA) based on CSI between the BS and a UE.

In the CoMP system, a serving BS and one or more cooperative BSs are connected to a scheduler through a backbone network. The scheduler can operate by receiving channel information about a channel state between each UE and each cooperative BS, which is measured by and fed back from each BS, through the backbone network. For example, the scheduler can schedule information for a collaborative MIMO operation of the serving BS and the cooperative BSs. That is, the scheduler can directly give an instruction about a collaborative MIMO operation to each BS.

As described above, the CoMP system can be regarded as a virtual MIMO system of a group of a plurality of cells. Basically, a communication scheme of MIMO using multiple antennas can be applied to CoMP.

Enhanced Reference Signal Transmission/Reception Scheme

Referring to Equations 5 to 18, UEs located in a cell initialize pseudo-random sequence generator for generating RS sequences, using the same $N_{ID}^{cell}$. Since a single UE transmits an uplink signal only to one cell in view of the UE, the UE uses only one $N_{ID}^{cell}$ to generate a PUSCH DM RS, a PUCCH DM RS and an SRS. That is, in a legacy system in which a UE transmits an uplink signal only to one cell, a UE based DM RS sequence was used. In other words, since the legacy communication system performs uplink transmission only for one cell, a UE can acquire $N_{ID}^{cell}$ (i.e., physical layer cell ID) based on a downlink Primary Synchronization Signal (PSS) and a Secondary Synchronization Signal (SSS) received from a serving cell and use the acquired to generate an uplink RS sequence.

However, in uplink CoMP, a UE can transmit an uplink signal to all or a part of a plurality of cells or reception points (RPs). In this case, if an uplink transmitter transmits an RS sequence generated using a legacy method, a receiver may not detect the RS sequence.

Accordingly, for CoMP by which a plurality of cells or RPs participate in communication with a UE, DM RS generation, resource allocation and/or transmission schemes for data transmitted to different points need to be defined even when the different points do not simultaneously receive the data. One RP can receive an uplink signal from a UE through one or more cells. However, for convenience of explanation, cells for receiving an uplink signal are collectively referred to as an RP in the following description.

The present invention proposes a method for generating an RS sequence used for PUSCH transmission, PUCCH transmission and/or SRS transmission by a CoMP UE in a multi-cell (multi-RP) environment.

Figure 12:
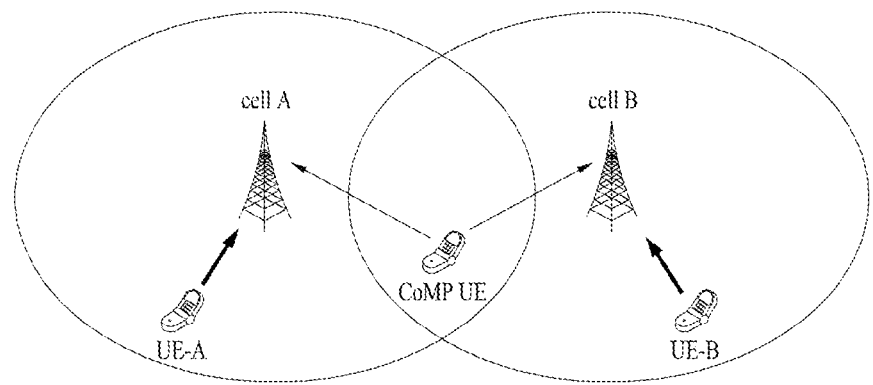
FIG. 12 is a view for describing an exemplary Uplink (UL) Coordinated Multi-Point (CoMP) operation.

FIG. 12 is a view for describing an exemplary UL CoMP operation.

In an uplink CoMP operation by which one UE (i.e., CoMP UE) transmits a PUSCH to a plurality of cells (or RPs), it is important to ensure mutual orthogonality among uplink DMRSs. If mutual orthogonality among uplink DMRSs is not ensured, each RP cannot correctly estimate an uplink channel and thus PUSCH demodulation performance can be greatly reduced. Basically, the UE can generate a base sequence of DMRS using a cell ID of a serving cell and apply an OCC for orthogonality with other DMRSs as necessary. Specifically, a base sequence of uplink DMRS should be determined as a function of the cell ID, and a base sequence index of PUSCH DMRS is determined to have an offset of $\Delta_{ss}$ relatively from a base sequence index of PUCCH DMRS. In this case, $\Delta_{ss}$ is given through higher layer signaling (e.g., RRC signaling). That is, the same cell ID is used to generate base sequences of the PUCCH DMRS and the PUSCH DMRS and a base sequence index offset of $\Delta_{ss}$ is applied therebetween (see Equation 12). For example, if $\Delta_{ss}=0$ is given through RRC signaling, the PUCCH DMRS and the PUSCH DMRS may be determined to have the same base sequence.

Since the CoMP UE can have different DL and UL serving cells, the cell ID of the DL serving cell cannot be equally used to generate a UL DMRS base sequence and the UL DMRS base sequence needs to be generated using a cell ID of an RP based on decision of a scheduler. That is, the UL DMRS base sequence should be generated using an ID of a cell other than a serving cell. To provide enough scheduling flexibility in determining UEs paired for MU-MIMO, it is desirable to dynamically indicate a cell ID used to generate a UL DMRS. For example, a higher layer can signal a plurality of DMRS configurations (including a DMRS configuration for cell A and a DMRS configuration for cell B) to a CoMP UE located at edges of cell A and cell B in FIG. 12. The CoMP UE may be co-scheduled with another UE (UE-A) of cell A or another UE (UE-B) of cell B according to channel conditions and/or other network side conditions. That is, a DMRS base sequence of the CoMP UE can be generated using an ID of a cell to which a UE co-scheduled with the CoMP UE belongs. The cell ID used to generate the DMRS base sequence can be dynamically selected or indicated.

Referring to Equations 1 to 4, UEs located in a cell can receive an RS (e.g., CSI-RS or UE-specific RS) sequence generated by a pseudo-random sequence generator initialized using the same $N_{ID}^{cell}$, from a BS. That is, in a legacy system in which a UE receives a downlink signal from one cell, a Physical layer Cell ID (PCI) may be used to generate a downlink sequence.

However, in downlink CoMP, a UE can receive a downlink signal from all or a part of a plurality of cells or transmission points (TPs). In this case, if a downlink transmitter transmits an RS sequence generated using a legacy method, a receiver (i.e., UE) may not detect the RS sequence.

Accordingly, for CoMP by which a plurality of cells or RPs participate in communication with a UE, CSI-RS and UE-specific RS generation, resource allocation and/or transmission schemes for channels from different points need to be defined even when the different points do not simultaneously transmit data. As such, a method for correctly receiving a CSI-RS and a UE-specific RS and performing CSI generation and PDSCH demodulation by a UE in DL CoMP needs to be defined.

In the present invention, a cell ID to be used to generate an RS base sequence may be provided to a UE to support the above-described uplink/downlink CoMP operation. In this case, the cell ID used to generate an RS base sequence may be represented using a parameter such as $n_{ID}$ to be distinguished from $N_{ID}^{cell}$ which is a parameter indicating a cell ID (i.e., PCI) used to generate a sequence of various types of RSs (i.e., UL RSs (e.g., PUSCH DMRS, PUCCH DMRS and SRS) and/or DL RSs (e.g., CSI-RS and UE-specific RS)) in a legacy operation. Here, $n_m$ may also be referred to as a Virtual Cell ID (VCI) for generating a UL/DL RS sequence. Basically, the VCI may have the same value as PCI, or may be configured to a different value from the PCI.

Further, a parameter (e.g., $\Delta_{ss}$) associated with generation/transmission of an RS may be signaled to a UE in addition to the VCI used to generate a base sequence of various types of RSs. In the present specification, the VCI and the related parameter(s) are referred to as an RS parameter set. In addition, the RS parameter set may be configured for a UE per an RS type or per a group of RS types. Besides, one or more RS parameter sets may be signaled for a single RS type or RS type group.

The RS parameter set for a certain RS type or RS type group may be explicitly signaled, or implicitly signaled based on configuration of an RS parameter set for another RS type or RS type group. To signal the RS parameter set, UE-specific higher layer signaling (e.g., RRC signaling) and/or dynamic signaling using DCI may be used.

A description is now given of embodiments of the above-described proposal of the present invention.

Configuration of RS Parameter Set for UL RS

A description is now given of a method for configuring an RS parameter set for a UL RS (i.e., PUSCH DMRS, PUCCH DMRS or SRS).

An individual RS parameter set may be basically configured per a UL RS type, but this may increase signaling overhead. Accordingly, the present invention proposes to define an RS parameter set commonly applied to RS types for repeated parts among parameter sets applied to the RS types. Further, RS parameter sets applied to individual RS types may be additionally defined. The common RS parameter set and the individual RS parameter sets may be signaled, and rules to which the common RS parameter set is applied and rules to which the individual RS parameter sets are applied may be additionally defined.

Embodiment 1

As described above, according to the proposal of the present invention, a VCI is used to determine a base sequence index of a specific type RS. The current embodiment proposes a method for configuring a VCI to the same value as a PCI (i.e., a PCI of a serving cell) and signaling one or more of $\Delta_{ss}^{PUSCH\_UE}(s)$, $\Delta_{ss}^{PUCCH\_UE}(s)$ and $\Delta_{ss}^{SRS\_UE}(s)$ for determining a sequence shift pattern $f_{ss}$ per an RS type through UE-specific RRC signaling.

Embodiment 1-A

The VCI is given as the PCI of the serving cell and thus does not need to be separately signaled. As such, a UE may generate an RS base sequence using the PCI of the serving cell and the other signaled parameters ($\Delta_{ss}^{PUSCH\_UE}(s)$, $\Delta_{ss}^{PUCCH\_UE}(s)$ or $\Delta_{ss}^{SRS\_UE}(s)$). That is, this corresponds to a case in which the common RS parameter is the VCI (=the PCI of the serving cell) and the individual RS parameter is $\Delta_{ss}$.

For example, the UE may receive parameters of $\{\Delta_{ss}^{PUSCH\_UE}(0), \Delta_{ss}^{PUSCH\_UE}(1), \ldots, \Delta_{ss}^{PUSCH\_UE}(L-1), \Delta_{ss}^{PUCCH\_UE}(0), \Delta_{ss}^{PUCCH\_UE}(1), \ldots, \Delta_{ss}^{PUCCH\_UE}(M-1), \Delta_{ss}^{SRS\_UE}(0), \Delta_{ss}^{SRS\_UE}(1), \ldots, \Delta_{ss}^{SRS\_UE}(N-1)\}$ through UE-dedicated RRC signaling. In this case, L, M and N are positive integers. L may correspond to the number of RPs (i.e., PUSCH target RPs) to which a PUSCH is transmitted. Descriptions of embodiments about M (i.e., the number of $\Delta_{ss}$ parameters applied to a PUCCH DMRS) and N (i.e., the number of $\Delta_{ss}$ parameters applied to an SRS) will be given below.

Embodiment 1-A-i

M may refer to a total number of available PUCCH formats. As such, in UL CoMP, a PUCCH can be transmitted to a different RP per a PUCCH format. That is, although the same VCI (e.g., the PCI of the serving cell) is used, if $\Delta_{ss}$ of the PUCCH DMRS is given as different values, different base sequences are eventually generated. The different base sequences may mean that the PUCCH is transmitted to different RPs. Since a transmission structure differs per a PUCCH format (see FIGS. 6 to 10), a specific RP may process a specific PUCCH format. Further, PUCCH formats having similar characteristics may be grouped and the individual RS parameter (i.e., $\Delta_{ss}$ in the current embodiment) may be configured per a PUCCH format group. When the PUCCH format group is configured, the same common parameter may be configured for a PUCCH format(s) belonging to one PUCCH format group. As an RS parameter assignment unit, the PUCCH format group may be configured as described below.

For example, $\Delta_{ss}^{PUCCH\_UE}(0)$ may correspond to PUCCH format 1/1a/1b, $\Delta_{ss}^{PUCCH\_UE}(1)$ may correspond to PUCCH format 2/2a/2b, and $\Delta_{ss}^{PUCCH\_UE}(2)$ may correspond to PUCCH format 3.

Further, the PUCCH formats may be subdivided to configure an RS parameter set for M=3 or above. For example, different $\Delta_{ss}^{PUCCH\_UE}$ values may be assigned to PUCCH format 1 and PUCCH format 1a/1b.

Alternatively, a common $\Delta_{ss}^{PUCCH\_UE}(m)$ value may be configured for specific PUCCH formats. For example, one $\Delta_{ss}^{PUCCH\_UE}(m)$ value may be commonly assigned to dynamic PUCCH formats 1a/1b and 3, and another $\Delta_{ss}^{PUCCH\_UE}(m')$ value may be commonly assigned to semi-static PUCCH formats 1a/1b and 2/2a/2b. Here, the dynamic PUCCH format refers to a PUCCH format used for ACK/NACK transmission in response to dynamically scheduled downlink transmission, and the semi-static PUCCH format refers to PUCCH format 1a/1b used for ACK/NACK transmission in response to downlink transmission semi-statically scheduled. In addition, another $\Delta_{ss}^{PUCCH\_UE}(m)$ value may be commonly assigned to PUCCH format 1a/1b triggered by an ePDCCH. Here, the ePDCCH triggered PUCCH format refers to a PUCCH format used for ACK/NACK transmission in response to downlink transmission scheduled by an ePDCCH (when a PDCCH transmitted in the control region of FIG. 3 is called a legacy PDCCH, the ePDCCH refers to an enhanced PDCCH transmittable in the data region of FIG. 3).

Embodiment 1-A-i'

In the above embodiments, since the VCI is configured as a common parameter to the same value as the PCI of the serving cell, a method for not signaling the VCI but signaling $\Delta_{ss}$ has been described. However, when a method for integrating a combination (or tie) of PCI and $\Delta_{ss}^{PUCCH\_UE}(m)$ into a single parameter VCI_PUCCH$_m$ (e.g., ranging from 0 to 503) is used as in the following proposal of the present invention (e.g., Embodiment 2 or Embodiment 7), an RS parameter set per a PUCCH format or a PUCCH format group may be assigned as described below.

For example, RS parameters may be configured in such a manner that VCI_PUCCH$_m$ corresponds to PUCCH format 1/1a/1b, VCI_PUCCH$_{m'}$ corresponds to PUCCH format 2/2a/2b, and VCI_PUCCH$_{m''}$ corresponds to PUCCH format 3. Further, the PUCCH formats may be subdivided and thus, for example, different VCI_PUCCH$_m$ values may be assigned to PUCCH format 1 and PUCCH format 1a/1b.

Alternatively, VCI_PUCCH$_m$ may be separately assigned only to dynamic PUCCH format 1/1a/1b and/or semi-static PUCCH format 1/1a/1b, and another VCI_PUCCH$_{m'}$ may be commonly assigned to the other PUCCH formats (e.g., PUCCH format 2/2a/2b, dynamic PUCCH format 3 and/or semi-static PUCCH format 3).

Otherwise, VCI_PUCCH$_m$ may be separately assigned only to dynamic PUCCH format 1/1a/1b/3 and/or dynamic PUCCH format 3 triggered by a PDCCH (e.g., legacy PDCCH and/or ePDCCH) received in a Common Search Space (CSS), and another VCI_PUCCH$_{m'}$ may be commonly assigned to the other PUCCH formats. Here, the other PUCCH formats may include dynamic PUCCH format 1/1a/1b/3 and/or dynamic PUCCH format 3, PUCCH format 2/2a/2b, semi-static PUCCH format, etc. triggered by a PDCCH (e.g., legacy PDCCH and/or ePDCCH) received in a UE-specific Search Space (USS).

Further, one VCI_PUCCH$_m$ value may be commonly assigned to dynamic PUCCH formats 1a/1b and 3, and another VCI_PUCCH$_{m'}$ value may be commonly assigned to semi-static PUCCH formats 1a/1b and 2/2a/2b. In addition, another $\Delta_{ss}^{PUCCH\_UE}(m'')$ value may be commonly assigned to PUCCH format 1a/1b and/or PUCCH format 3 triggered by an ePDCCH.

Alternatively, one VCI_PUCCH$_m$ value may be commonly assigned to dynamic PUCCH format 1a/1b and dynamic PUCCH format 3, and another VCI_PUCCH$_{m'}$ value may be commonly assigned to semi-static PUCCH format 1a/1b, PUCCH format 2/2a/2b and semi-static PUCCH format 3. Here, semi-static PUCCH format 3 may include a case in which the capacity of PUCCH format 3 usable to, for example, multiplex CSI is used for another semi-static PUCCH format.

Otherwise, one VCI_PUCCH$_m$ value may be commonly assigned to dynamic PUCCH format 1a/1b, another VCI_PUCCH$_{m'}$ value may be assigned to dynamic PUCCH format 3, and another VCI_PUCCH$_{m''}$ value may be commonly assigned to semi-static PUCCH format 1a/1b, PUCCH format 2/2a/2b and semi-static PUCCH format 3. Here, resources to which PUCCH format 3 is mapped may be indicated by an ACK/NACK Resource Indicator (ARI) included in a PDCCH DCI format, and VCI_PUCCH assigned to dynamic PUCCH format 3 may be further subdivided. For example, the above VCI_PUCCH$_{m'}$ value may be commonly assigned to or individual VCI_PUCCH_ARI(n) may be assigned to different ARI values indicating the resources of PUCCH format 3.

Although a common VCI (or a VCI configured to the same value as a PCI of a serving cell) is applied to all PUCCH formats in the above description, the PCI of the serving cell may be applied only to a specific PUCCH format group (e.g., dynamic PUCCH format 1a/1b, semi-static PUCCH format 1a/1b, dynamic PUCCH format 3 and/or semi-static PUCCH format 3). For example, a specific VCI (or a VCI configured to the same value as a PCI of a serving cell) may be fixed to dynamic PUCCH format 1a/1b and/or PUCCH format 3 triggered by a legacy PDCCH, and another VCI may be commonly configured for the other PUCCH formats (e.g., semi-static PUCCH format 1a/1b, semi-static PUCCH format 3 and/or PUCCH format 2/2a/2b) and dynamic PUCCH format 1a/1b and/or dynamic PUCCH format 3 triggered by an ePDCCH.

Embodiment 1-A-ii

M may refer to the number of PUCCH target RPs. As such, a PUCCH can be transmitted per a target RP.

Here, L may be restricted to L>M. Since L corresponds to the number of PUSCH target RPs and M corresponds to the number of PUCCH target RPs as described above, the number of PUSCH target RPs may be restricted to be equal to or greater than the number of PUCCH target RPs.

Further, when RS parameters include $\Delta_{ss}^{PUCCH}$, all of M $\Delta_{ss}^{PUCCH\_UE}$ values may be restricted to be a subset of L $\Delta_{ss}^{PUSCH\_UE}$ values (including a case in which M $\Delta_{ss}^{PUCCH\_UE}$ values are the same as L $\Delta_{ss}^{PUSCH\_UE}$ values). This provides more flexible target RP configuration to a PUSCH for uplink data transmission compared to a PUCCH for UCI transmission. In other words, an uplink CoMP RP set of the PUCCH may be selected as a subset of an uplink CoMP RP set of the PUSCH.

Alternatively, all of M $\Delta_{ss}^{PUCCH\_UE}$ values may be configured to have exactly the same values as all or a part of L $\Delta_{ss}^{PUSCH\_UE}$ values in one to one manner. For example, $\Delta_{ss}^{PUSCH\_UE}(0)=\Delta_{ss}^{PUCCH\_UE}(0)$, $\Delta_{ss}^{PUSCH\_UE}(1)=\Delta_{ss}^{PUCCH\_UE}(1), \ldots, \Delta_{ss}^{PUSCH\_UE}(M-1)=\Delta_{ss}^{PUCCH\_UE}(M-1)$ may be configured.

As described above, if parameter sets of different RS types (e.g., PUSCH DMRS and PUCCH DMRS) are repeated partially or entirely, the parameter sets for the RS types do not need to be separately signaled and thus signaling of the RS parameter set for any one RS type may be omitted. In this case, the not-signaled parameter set of the RS type (e.g., PUCCH DMRS) may be implicitly determined using a mapping relationship based on the signaled parameter set of the RS type (e.g., PUSCH DMRS). The mapping relationship may be pre-defined or may be separately signaled from an eNB to a UE.

For example, only the L parameter sets $\{\Delta_{ss}^{PUSCH\_UE}(0), \Delta_{ss}^{PUSCH\_UE}(1), \ldots, \Delta_{ss}^{PUSCH\_UE}(L-1)\}$ for the PUSCH may be signaled to the UE, and the M parameters for the PUCCH may not be signaled. Here, the eNB may signal only the value M to the UE. As such, the UE may determine first M parameters $\{\Delta_{ss}^{PUSCH\_UE}(0), \Delta_{ss}^{PUSCH\_UE}(1), \ldots, \Delta_{ss}^{PUSCH\_UE}(M-1)\}$ among the L RS parameters for the PUSCH as the RS parameter set for the PUCCH. That is, $\Delta_{ss}^{PUSCH\_UE}(0)=\Delta_{ss}^{PUSCH\_UE}(0), \ldots, \Delta_{ss}^{PUCCH\_UE}(M-1)=\Delta_{ss}^{PUSCH\_UE}(M-1)$ may be determined.

For the above-described implicit determination of the RS parameter set, the mapping relationship may be pre-defined. The mapping relationship may be semi-statically signaled through RRC signaling, or dynamically signaled using specific DCI.

In a system environment in which a larger number of PUCCH target RPs compared to the number of PUSCH target RPs is advantageous, L may be restricted to L≤M oppositely to the above description. In this case, the L RS parameter sets for the PUSCH may be configured as a subset of the M RS parameter sets for the PUCCH, or may be implicitly determined on the basis of a predetermined mapping relationship based on the M RS parameter sets for the PUCCH.

Further, when M is determined as the number of PUCCH target RPs as in the current embodiment, an RS parameter set to be applied to a PUCCH format (e.g., dynamic PUCCH format 1a/1b) for dynamic ACK/NACK transmission may be dynamically determined among the M RS parameter sets. For example, when ACK/NACK is transmitted on a PUCCH in response to a PDSCH scheduled using a DL-related DCI format of a specific PDCCH, the RS parameter set to be applied to the PUCCH may be dynamically indicated using a specific bit or field in the DL-related DCI format. In other words, since the PUCCH RS parameter set is configured to correspond to the number of PUCCH target RPs as described above, RPs to which ACK/NACK is transmitted on the PUCCH may be determined using the specific bit or field in the DL-related DCI format. The information indicating a specific RS parameter set (or specific target RP) may also be dynamically indicated for other PUCCH formats not used to transmit ACK/NACK.

If the previous proposals of Embodiment 1-A-i and/or Embodiment 1-A-i' are applied together with the current proposal of Embodiment 1-A-ii, the value M may be configured in consideration of the number of PUCCH format groups in addition to the number of PUCCH target RPs. For example, a number of $\Delta_{ss}^{PUCCH\_UE}$ values may be configured to correspond to the number of PUCCH format groups, and $\Delta_{ss}^{PUCCH\_UE}$ for dynamically indicating one of a plurality of target RPs may be additionally configured for a specific PUCCH format, thereby determining the value M corresponding to the number of all possible cases. In this case, L≤M may be configured.

Embodiment 1-A-iii

N may refer to the number of SRS target RPs. As such, an SRS can be transmitted per a target RP.

Here, L may be restricted to L≥N. Since L corresponds to the number of PUSCH target RPs and N corresponds to the number of SRS target RPs as described above, the number of PUSCH target RPs may be restricted to be equal to or greater than the number of SRS target RPs. This restriction considers that Tx power control of an SRS is determined to have a predetermined difference value from Tx power of a PUSCH based on link adaptation. That is, since the number of PUSCH target RPs is configured to be equal to or greater than the number of SRS target RPs, flexibility of PUSCH target RPs may be further ensured.

Further, all of N $\Delta_{ss}^{SRS\_UE}$ values may be configured as a subset of L $\Delta_{ss}^{PUSCH\_UE}$ values. This means that an SRS base sequence is configured to correspond to each of a subset of PUSCH target RPs.

Alternatively, all of N $\Delta_{ss}^{SRS\_UE}$ values may be configured to have exactly the same values as all or a part of L $\Delta_{ss}^{PUSCH\_UE}$ values in one to one manner. For example, $\Delta_{ss}^{PUSCH\_UE}(0)=\Delta_{ss}^{SRS\_UE}(0)$, $\Delta_{ss}^{PUSCH\_UE}(1)=\Delta_{ss}^{SRS\_UE}(1)$, ..., $\Delta_{ss}^{PUSCH\_UE}(N-1)=\Delta_{ss}^{SRS\_UE}(N-1)$ may be configured.

As described above, if parameter sets of different RS types (e.g., PUSCH DMRS and SRS) are repeated partially or entirely, the parameter sets for the RS types do not need to be separately signaled and thus signaling of the RS parameter set for any one RS type may be omitted. In this case, the not-signaled parameter set of the RS type (e.g., SRS) may be implicitly determined using a mapping relationship based on the signaled parameter set of the RS type (e.g., PUSCH DMRS). The mapping relationship may be pre-defined or may be separately signaled from an eNB to a UE.

For example, only the L parameter sets {$\Delta_{ss}^{PUSCH\_UE}(0)$, $\Delta_{ss}^{PUSCH\_UE}(1)$, ..., $\Delta_{ss}^{PUSCH\_UE}(L-1)$} for the PUSCH may be signaled to the UE, and the N parameters for the SRS may not be signaled. Here, the eNB may signal only the value N to the UE. As such, the UE may determine first N parameters {$\Delta_{ss}^{PUSCH\_UE}(0)$, $\Delta_{ss}^{PUSCH\_UE}(1)$, ..., $\Delta_{ss}^{PUSCH\_UE}(N-1)$} among the L RS parameters for the PUSCH as the RS parameter set for the SRS. That is, $\Delta_{ss}^{SRS\_UE}(0)=\Delta_{ss}^{PUSCH\_UE}(0)$, ..., $\Delta_{ss}^{SRS\_UE}(M-1)=\Delta_{ss}^{PUSCH\_UE}(N-1)$ may be determined.

For the above-described implicit determination of the RS parameter set, the mapping relationship may be pre-defined. The mapping relationship may be semi-statically signaled through RRC signaling, or dynamically signaled using specific DCI.

Embodiment 1-A-iv

N may refer to the number of SRS Power Control (PC) processes.

For example, in a Heterogeneous Network (HetNet) including both a macro-cell and a pico-cell, although a downlink serving cell is the macro-cell, an uplink reception point can be configured as the pico-cell geographically closer to a CoMP UE (particularly, case of TDD). An SRS transmitted by the CoMP UE to the pico-cell may be used to correctly determine uplink CSI by the pico-cell (hereinafter referred to as a UL-CSI acquisition SRS). An SRS transmitted by the CoMP UE to the macro-cell may be used to correctly determine downlink CSI by the macro-cell (hereinafter referred to as a DL-CSI acquisition SRS). For example, since uplink and downlink are distinguished from each other by time on the same frequency in a TDD system, the downlink CSI may be determined from an SRS transmitted in uplink due to reciprocity of uplink and downlink. Here, the UL-CSI acquisition SRS and the DL-CSI acquisition SRS may be configured to follow different PC processes. In the above example, the UL-CSI acquisition SRS is directed to the pico-cell which is close to the CoMP UE and thus a PC process may operate with relatively low Tx power. On the other hand, the DL-CSI acquisition SRS is directed to the macro-cell which is away from the CoMP UE and thus a PC process may operate with relatively high Tx power. In this case, since the number of different PC processes associated with SRS is 2, N=2 may be configured and a total of 2 RS parameter sets (e.g., 2 $\Delta_{ss}^{SRS\_UE}$ values) for the UL-CSI acquisition SRS and the DL-CSI acquisition SRS may be configured.

Another example of different SRS PC processes include an SRS PC process tied with a PUSCH PC process for link adaptation of a PUSCH, and a DL-CSI acquisition SRS PC process.

If the previous proposal of Embodiment 1-A-iii is applied together with the current proposal of Embodiment 1-A-iv, the value N may be configured in consideration of the number of SRS target RPs in addition to the number of SRS PC processes. For example, a number of $\Delta_{ss}^{SRS\_UE}$ values may be configured to correspond to the number of SRS PC processes, and $\Delta_{ss}^{SRS\_UE}$ for dynamically indicating a specific RP among a plurality of target RPs may be additionally configured for a specific SRS PC process, thereby determining the value N corresponding to the number of all possible cases. In this case, L≤N may be configured.

Embodiment 1-A-v

The current embodiment relates to a method for dynamically signaling which RS parameter is applied among RS parameter sets for PUSCH/PUCCH/SRS which are signaled by a higher layer based on the PUCCH RS parameter set grouping method, the SRS RS parameter set grouping method, and the method using correlations among PUSCH/PUCCH/SRS RS parameter sets, as proposed above in Embodiments 1-A-i to 1-A-iv.

For example, a parameter may be dynamically selected from the PUSCH RS parameter set {$\Delta_{ss}^{PUSCH\_UE}(0)$, $\Delta_{ss}^{PUSCH\_UE}(1)$, ..., $\Delta_{ss}^{PUSCH\_UE}(L)$} through dynamic indication at a specific time. Alternatively, a parameter may be dynamically selected from the PUCCH RS parameter set {$\Delta_{ss}^{PUCCH\_UE}(0)$, $\Delta_{ss}^{PUCCH\_UE}(1)$, ..., $\Delta_{ss}^{PUCCH\_UE}(M)$} through dynamic indication at a specific time. Otherwise, a parameter may be dynamically selected from the SRS RS parameter set {$\Delta_{ss}^{SRS\_UE}(0)$, $\Delta_{ss}^{SRS\_UE}(1)$, ..., $\Delta_{ss}^{SRS\_UE}(N)$} through dynamic indication at a specific time. That is, when L RS parameter set candidates are configured for the PUSCH, M RS parameter set candidates are configured for the PUCCH, or N RS parameter set candidates are configured for the SRS, which RS parameter set among those RS parameter set candidates is actually used to generate a PUSCH/PUCCH/SRS RS base sequence may be dynamically indicated.

For example, one of the L PUSCH RS parameter sets may be indicated using a specific bit of a DCI format (e.g., DCI format 0 or 4, hereinafter referred to as a UL-related DCI format) including a PUSCH scheduling UL grant. For this dynamic indication, a new bit(s) may be newly added to the corresponding DCI format or an already defined specific bit(s) may be reused for dynamic indication of the RS parameter set. For example, fields defined in the UL-related DCI format include 1 bit indicating uplink multi-cluster Resource Allocation Type (RAT), and this may be reused (or implicitly indicated) as the dynamic indicator bit of the RS parameter set. When carrier aggregation by which a plurality of cells are configured for a UE is supported, resource utilization can be increased by assigning a non-contiguous frequency band to a UE located at the center of a cell, and the RAT indication bit is used to indicate whether uplink multi-cluster frequency allocation is applied. In general, it can be assumed that a UE operating according to the present invention to generate an RS base sequence for coordinated communication with multiple cells is located at a cell edge and communicates with a serving cell and a neighbor cell(s). Accordingly, since multi-cluster uplink frequency allocation is not applied to the UE located at a cell edge in most cases, a reduction in system performance may not be expected even when the RAT indication bit is used for another purpose.

In the case of PUCCH, for a PUCCH format for ACK/NACK transmission, a specific bit(s) in a DL-related DCI format which carries information for scheduling downlink transmission associated with corresponding ACK/NACK may be used to indicate one of the M RS parameter sets for the PUCCH.

In the case of SRS, a specific bit(s) in a DCI format (e.g., DCI format 0/1A/4 for FDD, DCI format 0/1A/2B/2C/4 for TDD) for triggering an aperiodic SRS (A-SRS) may be used to indicate one of the N RS parameter sets for the SRS.

The above method for dynamically indicating an RS parameter set for PUSCH/PUCCH/SRS is purely exemplary, and the scope of the present invention includes a method for dynamically indicating an RS parameter set using a predetermined bit which is present in a DCI format.

Embodiment 1-B

As described above in Embodiment 1, in the above method for not signaling a VCI value separately but using a PCI value of a serving cell as the VCI value, a restriction may be applied to PCIs of cells belonging the same CoMP cluster.

Specifically, the present invention proposes to configure PCIs of cells belonging the same CoMP cluster to satisfy the same floor(PCI/30) value. Here, floor(x) denotes a maximum integer not greater than x. For example, when a network assigns PCI1 to cell1, PCI2 to cell2, and PCI3 to cell3 (where PCI1 PCI2 PCI3), values satisfying floor(PCI1/30)=floor(PCI2/30)=floor(PCI3/30) as the PCI1, PCI2 and PCI3 values. Further, considering that up to 30 different PCIs can have the same floor(PCI/30) value and a PCI can be reused (or repeated) among cells spaced geographically sufficiently apart from each other, the possibility of lack of PCI resources is extremely low even when PCI assignment restriction proposed by the present invention is applied.

When PCIs of cells belonging the same CoMP cluster are assigned to have the same floor(PCI/30) value as described above, all cells in the cluster have the same initial value $c_{init} = \lfloor PCI/30 \rfloor$ (see Equation 10) of a group hopping pattern $f_{gh}(n_s)$ pseudo-random sequence generator. This means that a PCI (or VCI) of a specific cell does not need to be signaled to a UE even when PUSCH DMRS/PUCCH DMRS/SRS is transmitted to another cell in the CoMP cluster, because the UE can acquire the same RS base sequence using a PCI of a serving cell thereof compared to a case in which a PCI of the other cell is used. Here, since acquisition of the same RS base sequence in terms of group hopping pattern means that the group hopping base sequence used by the UE of the serving cell is the same as that used by another UE of another cell as well as another UE of the serving cell, orthogonality of RSs received from different UEs may be ensured by varying only a cyclic shift (CS). Accordingly, although a network does not separately signal a VCI to a UE, the UE may use a PCI of a serving cell thereof.

Accordingly, only an RS parameter set (e.g., $\Delta_{ss}$) corresponding to a target cell (or target RP) may be signaled to a CoMP UE as described above in Embodiment 1-A to allow the CoMP UE to transmit PUSCH DMRS/PUCCH DMRS/SRS to a cell other than a serving cell.

In brief, a VCI may be configured in such a manner that a floor(VCI/30) value of the VCI among RS parameter sets for PUSCH/PUCCH/SRS used to apply the methods proposed by specific embodiments of Embodiment 1-A has the same value as floor(PCI/30) of a PCI used to support legacy UEs by a target RP. Here, the VCI may not be explicitly signaled, and a rule to use a specific PCI (e.g., a PCI of a serving cell) may be pre-defined.

The reason why the VCI is restricted as described above is because, since a UL PUSCH DMRS/PUCCH DMRS/SRS is configured by applying 17 hopping patterns to 30 sequences (see above description associated with Equation 6), when the value of floor(VCI/30) is different from the value of floor(PCI/30), collision can occur due to the difference between an RS base sequence generated based on the VCI and an RS base sequence generated based on the PCI. Accordingly, in a CoMP operation by which a plurality of RPs share the same PCI, the relationship between VCI and PCI for each RP may be correctly supported. Further, PCIs of cells in a CoMP cluster may be configured to satisfy floor(VCI/30)=floor(PCI/30).

Although a method for allowing a UE to use a PCI of a serving cell as a VCI has been described in the above embodiments, according to other embodiments of the present invention, a specific PCI (the PCI of the serving cell or another PCI) may be signaled to the UE and then the above descriptions may be equally applied. For example, a specific PCI value (this value does not need to be the PCI of the serving cell) may be signaled as a VCI through RRC signaling to commonly use the VCI (i.e., specific PCI), and RS parameter sets for PUSCH/PUCCH/SRS (e.g., one or more $\Delta_{ss}^{PUSCH\_UE}$, one or more $\Delta_{ss}^{PUCCH\_UE}$, one or more $\Delta_{ss}^{SRS\_UE}$) may be signaled through UE-specific RRC signaling. Further, use of a specific parameter set among the RS parameter sets signaled through RRC signaling may be indicated through dynamic signaling.

A floor(PCI/30) value of the specific PCI signaled as the VCI may be different from a floor(PCI/30) value of the PCI of the serving cell. If this specific PCI is signaled through RRC signaling, the UE may apply the specific PCI to an equation associated with an initial value $c_{init}$ of a pseudo-random sequence generator of a group hopping pattern $f_{gh}(n_s)$. In addition, the UE may generate an RS base sequence based on dynamic signaling of another RS parameter (e.g., $\Delta_{ss}$).

When no specific PCI is signaled as the VCI through RRC signaling, a rule to basically generate an RS base sequence using the PCI of the serving cell may be pre-defined.

Alternatively, information indicating one of a plurality of PCIs including the PCI of the serving cell, as a VCI parameter to be applied to generate an RS base sequence may be defined in the form of a specific bit(s), and this may be provided to the UE through RRC signaling or dynamic signaling.

Embodiment 1-C

The current embodiment relates to specific embodiments of Embodiments 1-A and 1-B for applying a specific PCI value (e.g., a PCI of a serving cell or a specific PCI determined using the above restriction) as a VCI and generating an RS base sequence of PUSCH DMRS/PUCCH DMRS/SRS using UE-specifically signaled $\Delta_{ss}$ parameters.

In the case of PUSCH DMRS, to determine a base sequence index u (i.e., group hopping index) defined as shown in Equation 6, an initial value $c_{init}$ of a pseudo-random sequence generator of a group hopping pattern $f_{gh}(n_s)$ may be determined based on $c_{init} = \lfloor PCI/30 \rfloor$ (where PCI may refer to the specific PCI signaled as the VCI) as shown in Equation 10. In addition, a sequence shift pattern $f_{ss}$ may be determined as shown in Equation 19.

$$f_{ss}^{PUSCH} = \{(PCI \bmod 30) + \Delta_{ss}^{PUSCH\_UE}(l)\} \bmod 30 \quad \text{[Equation 19]}$$

In Equation 19, PCI may refer to the specific PCI signaled as the VCI. In Equation 19, In the case of PUCCH DMRS, the initial value of the pseudo-random sequence generator of the group hopping pattern may be determined based on $c_{init} = \lfloor PCI/30 \rfloor$ (where PCI may refer to the specific PCI signaled as the VCI). The sequence shift pattern $f_{ss}$ may be determined as shown in Equation 20.

$$f_{ss}^{PUCCH} = \{(PCI \bmod 30) + \Delta_{ss}^{PUCCH\_UE}(m)\} \bmod 30 \quad \text{[Equation 20]}$$

In Equation 20, PCI may refer to the specific PCI signaled as the VCI. In Equation 20, m=0, . . . , M.

Alternatively, when the legacy calculation method of Equation 11 is used, $f_{ss}^{PUCCH} = PCI \bmod 30$ (where PCI may refer to the specific PCI signaled as the VCI) may be defined. In this case, an RS parameter set $\{\Delta_{ss}^{PUCCH\_UE}(0), \Delta_{ss}^{PUCCH\_UE}(1), \ldots, \Delta_{ss}^{PUCCH\_UE}(M)\}$ for the PUCCH DMRS may operate to be excluded from UE-specific RRC signaling (i.e., not to be signaled).

In the case of SRS, the initial value of the pseudo-random sequence generator of the group hopping pattern may be determined based on $c_{init} = \lfloor PCI/30 \rfloor$ (where PCI may refer to the specific PCI signaled as the VCI). The sequence shift pattern $f_{ss}$ may be determined as shown in Equation 21.

$$f_{ss}^{SRS} = \{(PCI \bmod 30) + \Delta_{ss}^{SRS}(n)\} \bmod 30 \quad \text{[Equation 21]}$$

In Equation 21, PCI may refer to the specific PCI signaled as the VCI. In Equation 21, n=0, . . . , N.

As described above in the paragraph above Equation 18, a base sequence index u (i.e., group hopping index) used to generate a legacy SRS base sequence is defined to follow a sequence group number of a PUCCH DMRS. However, in the present invention, a parameter independent from a parameter applied to the PUCCH DMRS may be used for an SRS to calculate a sequence shift pattern, and thus the base sequence of the SRS may be generated independently from the base sequence of the PUCCH DMRS.

Embodiment 2

In a legacy method for determining a sequence shift pattern $f_{ss}$ of an RS base sequence (see Equation 12, for example), a PCI (i.e., $N_{ID}^{cell}$) and an offset value (i.e., $\Delta_{ss}$) are used. Here, the PCI ranges from 0 to 503. Since the values 0 to 503 of the PCI are not sufficient to cover 510 possible cases (i.e., 30 base sequence groups×17 sequence group hopping patterns), the offset value (i.e., $\Delta_{ss}$) is defined and used.

In a method for determining a base sequence index for PUSCH DMRS/PUCCH DMRS/SRS according to the present invention, a sequence shift pattern $f_{ss}$ may be determined using a VCI indicated through higher layer signaling without using $\Delta_{ss}$ (or configuring $\Delta_{ss}=0$). Since $\Delta_{ss}$ is used in the sequence shift pattern determination method defined for a legacy wireless communication system to cover 30 base sequence groups and 17 sequence group hopping patterns as described above, the range of the VCI needs to be newly defined when only the VCI is used without using $\Delta_{ss}$, and the present invention proposes to define the VCI to range from 0 to 509. VCI information configured to one of the values 0 to 509 may be RRC signaled to a UE.

When various proposals of the present invention described above in Embodiment 1 are used together with the VCI ranging from 0 to 509, an RS parameter set may be additionally signaled to the UE. For example, an RS parameter set (e.g., $\Delta_{ss}^{PUCCH\_UE}(s)$ and/or $\Delta_{ss}^{SRS\_UE}(s)$) for transmitting a PUCCH DMRS and/or an SRS to another RP may be provided. Further, an RS parameter set (e.g., $\Delta_{ss}^{PUSCH\_UE}(s)$) for transmitting a PUSCH to another RP may be provided. That is, one or more of the VCI (e.g., ranging from 0 to 509), the RS parameter set for the PUSCH, the RS parameter set for the PUCCH and the RS parameter set for the SRS may be provided through UE-specific RRC signaling.

In addition, the part associated with a specific PCI used without signaling a VCI in Embodiment 1 may be replaced with a VCI (i.e., VCI ranging from 0 to 509) signaled in Embodiment 2, and the other operations may be equal.

Embodiment 3

A method for defining and using an RS parameter set (VCI and/or $\Delta_{ss}$) to generate a base sequence of a PUCCH DMRS and/or an SRS has been described above in Embodiments 1 and 2. The current embodiment proposes elements to be additionally included in an RS parameter set. One or more of various parameters described below may be provided through UE-specific RRC signaling. For example, the various parameters described below may be signaled together with VCI and/or $\Delta_{ss}$. Alternatively, a parameter(s) to be cell-specifically and/or UE-specifically provided according to operation defined in a legacy wireless communication system among the various parameters described below may be signaled separately from VCI and/or $\Delta_{ss}$ or may not be signaled to reuse a previously provided parameter.

Embodiment 3-A

In the case of PUCCH, a parameter for generating a DMRS sequence directed to a specific cell (e.g., a cell other than a serving cell) may include all cell-specific parameters of the specific cell.

For example, $\Delta_{shift}^{PUCCH}$, $\delta_{offset}^{PUCCH}$, $\beta_{PUCCH}$ and $N_{PUCCH}^{(1)}$ to be provided to a UE(s) served by a second cell may be provided to a UE served by a first cell.

$\Delta_{shift}^{PUCCH}$ is a cell-specific parameter for determining a CS interval to determine a PUCCH OCC and a CS index, and may be configured to one of 1, 2 and 3 for a normal CP and to one of 2 and 3 for an extended CP.

$\delta_{offset}^{PUCCH}$ is a parameter configured for inter-cell interference randomization, and may be configured to one of $\{0, 1, \ldots, \Delta_{shift}^{PUCCH}-1\}$.

$\beta_{PUCCH}$ is an amplitude scaling factor used to determine PUCCH Tx power.

$N_{PUCCH}^{(1)}$ is a parameter UE-specifically configured to determine a PUCCH resource offset. $N_{PUCCH}^{(1)}$ is used to determine $n_{PUCCH}^{(1)}$ indicating a PUCCH resource index (i.e., PUCCH CS index), and refers to a start point (i.e., offset) of a PUCCH resource region.

In addition, a new parameter representing a resource region in which a PUCCH is transmitted may be defined and used. For example, a PRB number corresponding to a PUCCH transmission resource may be explicitly provided through UE-specific signaling.

In this case, as a DMRS sequence (i.e., a base sequence determined based on a VCI value) is changed, the UE-specific $N_{PUCCH}^{(1)}$ or the PUCCH resource PRB index value may be correspondingly changed. Further, additional signaling for indicating this may be defined and used.

The above-described UE-specific PUCCH resource indication parameters are collectedly denoted by $N_{PUCCH\_UE}^{(1)}$ in the present invention. $N_{PUCCH\_UE}^{(1)}$ may be configured to a value independent from $N_{PUCCH}^{(1)}$ cell-specifically configured in a corresponding cell.

Further, an $N_{PUCCH\_UE}^{(1)}$ value to be commonly applied to dynamic PUCCH format 1a/1b and/or dynamic PUCCH format 3 triggered by a legacy PDCCH, and dynamic PUCCH format 1a/1b and/or dynamic PUCCH format 3 triggered by an ePDCCH may be configured.

Alternatively, an $N_{PUCCH\_UE}^{(1)}$ value to be applied to dynamic PUCCH format 1a/1b and/or dynamic PUCCH format 3 triggered by a legacy PDCCH, and $N_{PUCCH\_UE(1)}^{(1)'}$, which is independent from $N_{PUCCH\_UE}^{(1)}$ may be UE-specifically defined and used. For example, $N_{PUCCH\_UE}^{(1)'}$ may correspond to a PUCCH resource indication parameter to be applied to dynamic PUCCH format 1a/1b and/or dynamic PUCCH format 3 triggered by an ePDCCH.

Otherwise, an $N_{PUCCH\_UE}^{(1)}$ value to be applied to dynamic PUCCH format 1a/1b and/or dynamic PUCCH format 3 triggered by a legacy PDCCH or ePDCCH received in a CSS may be configured. Here, $N_{PUCCH\_UE}^{(1)} = N_{PUCCH}^{(1)}$ may be configured. In addition to this, an $N_{PUCCH\_UE}^{(1)'}$ value to be applied to dynamic PUCCH format 1a/1b and/or dynamic PUCCH format 3 triggered by a legacy PDCCH or ePDCCH received in a USS may be UE-specifically defined and used.

The additional parameter sets (e.g., $\Delta_{shift}^{PUCCH}$, $\delta_{offset}^{PUCCH}$ and/or $\beta_{PUCCH}$) may be additionally configured for each of $N_{PUCCH\_UE}^{(1)}$ and $N_{PUCCH\_UE}^{(1)'}$.

Further, parameters of a serving cell may be applied to PUCCH format 1a/1b for dynamic ACK/NACK such that PUCCH format 1a/1b is always directed to the serving cell, and the above RS parameter sets (e.g., VCI, $\Delta_{ss}$, $\Delta_{shift}^{PUCCH}$, $\delta_{offset}^{PUCCH}$, $\delta_{PUCCH}$ and/or $N_{PUCCH\_UE}^{(1)}$) may be provided to another PUCCH format (e.g., PUCCH format 2/2a/2b/3) through UE-specific signaling such that the other PUCCH format is directed to another cell.

In Embodiments 1 and 2, an RS parameter set for generating a base sequence for a PUCCH may include VCI, $\Delta_{ss}$, $\Delta_{shift}^{PUCCH}$, $\delta_{offset}^{PUCCH}$, $\beta_{PUCCH}$ and/or $N_{PUCCH\_UE}^{(1)}$.

Embodiment 3-B

In the case of SRS, a parameter for generating an SRS sequence directed to a specific cell (e.g., a cell other than a serving cell) may include all cell-specific parameters of the specific cell.

For example, $n_{SRS}^{cs}$, $\beta_{SRS}$, $N_{ap}$, $k_0^{(p)}$, $M_{sc,b}^{RS}$, $C_{SRS}$, $B_{SRS}$, srsMaxUpPts, $\bar{k}_{TC}$, $n_b$, $n_{hf}$, $b_{hop}$, $T_{SRS}$, $T_{offset}$, $T_{SFC}$ and $\Delta_{SFC}$ to be provided to a UE(s) served by a second cell may be provided to a UE served by a first cell.

$n_{SRS}^{cs}$ may be configured to one of {0, 1, 2, 3, 4, 5, 6, 7}, and is provided for each UE. $n_{SRS}^{cs}$ may be configured by higher layer parameters cyclicshift and cyclicshift-ap individually for a periodic SRS configuration and an aperiodic SRS configuration.

$\beta_{SRS}$ is an amplitude scaling factor used to determine SRS Tx power $P_{SRS}$.

$N_{ap}$ indicates the number of antenna ports used for SRS transmission. A set of antenna ports used for SRS transmission may be configured individually for a periodic SRS configuration and an aperiodic SRS configuration.

$k_0^{(p)}$ is a parameter for determining the starting position of the SRS in the frequency domain when a UE-specific parameter for determining an SRS bandwidth (i.e., b) is given as $B_{SRS}$.

$M_{sc,b}^{RS}$ indicates the length of a sounding reference signal and is given as $M_{sc,b}^{RS} = m_{SRS,b} N_{sc}^{RB}/2$.

$C_{SRS}$ is a cell-specific parameter srs-BandwidthConfig indicating a set of configurations of the SRS bandwidth, and is configured to one of {0, 1, 2, 3, 4, 5, 6, 7} by a higher layer.

$B_{SRS}$ is a UE-specific parameter srs-Bandwidth associated with the SRS bandwidth, and is configured to one of {0, 1, 2, 3} by a higher layer.

For a UpPTS, if reconfiguration of m is enabled by a cell-specific parameter srsMaxUpPts given by a higher layer, $m_{SRS,0}^{max} = \max_{c \in C}\{m_{SRS,0}^c\} \leq (N_{RB}^{UL} - 6N_{RA})$ may be reconfigured. If reconfiguration is disabled, $m_{SRS,0}^{max} = m_{SRS,0}$ is given. Here, c denotes an SRS bandwidth configuration, and $N_{RA}$ denotes the number (i.e., index) of a format 4 Physical Random Access Channel (PRACH) in a corresponding UpPTS.

$\bar{k}_{TC} \in \{0,1\}$ is signaled by a higher layer using a UE-specific parameter transmissionComb or transmissionComb-ap defined individually for a periodic SRS configuration and an aperiodic SRS configuration.

$n_b$ indicates a frequency position index.

$n_{hf}$ is given as 0 in a UpPTS of a first half frame of a radio frame, and as 1 in a UpPTS of a second half frame.

$b_{hop} \in \{0,1,2,3\}$ is a parameter for configuring frequency hopping of the SRS, and is provided using a higher layer parameter srs-HoppingBandwidth. Frequency hopping is not supported for aperiodic SRS transmission. When frequency hopping of the SRS is not enabled (i.e., if $b_{hop} \geq B_{SRS}$), the frequency position index $n_b$ is maintained as a constant as long as reconfiguration is not performed, and $n_b = \lfloor 4n_{RRC}/m_{SRS,b} \rfloor \mod N_b$ is defined. Here, a parameter $n_{RRC}$ is given by higher layer parameters freqDomainPosition and freqDomainPosition-ap individually for a periodic SRS configuration and an aperiodic SRS configuration.

$T_{SRS}$ indicates a UE-specific SRS transmission cycle, and $T_{offset}$ is an SRS subframe offset. $T_{offset\_max}$ is a maximum value of $T_{offset}$ at a certain SRS subframe offset.

$T_{SFC}$ indicates a cell-specific subframe configuration cycle for SRS transmission, and $\Delta_{SFC}$ is a cell-specific subframe offset for SRS transmission.

In Embodiments 1 and 2, VCI, $\Delta_{ss}$, $n_{SRS}^{cs}$, $\beta_{SRS}$, $N_{ap}$, $k_0^{(p)}$, $M_{sc,b}^{RS}$, $C_{SRS}$, $B_{SRS}$, srsMaxUpPts, $\bar{k}_{TC}$, $n_b$, $n_{hf}$, $b_{hop}$, $T_{SRS}$, $T_{offset}$, $T_{SFC}$ and/or $\Delta_{SFC}$ may be provided through UE-specific signaling as an RS parameter set for generating a base sequence for an SRS.

Embodiment 3-C

In the case of PUSCH, a parameter for generating a PUSCH DMRS sequence directed to a specific cell (e.g., a cell other than a serving cell) may include all cell-specific parameters of the specific cell.

For example, $n_{DMRS}^{(1)}$ and $\beta_{PUSCH}$ to be provided to a UE(s) served by a second cell may be provided to a UE served by a first cell.

$n_{DMRS}^{(1)}$ may have values determined based on a higher layer parameter cyclic shift as shown in Table 4.

TABLE 4

| cyclic shift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

$\beta_{PUCCH}$ is an amplitude scaling factor used to determine PUSCH Tx power.

In Embodiments 1 and 2, an RS parameter set for generating a base sequence for a PUSCH may include VCI, $\Delta_{ss}$, $n_{DMRS}^{(1)}$ and/or $\beta_{PUSCH}$.

Embodiment 4

In the method for generating a base sequence of PUSCH DMRS/PUCCH DMRS/SRS described above in Embodiments 1 to 3, RS parameter set candidates may be provided through higher layer signaling (e.g., RRC signaling) and a specific RS parameter set to be used to generate an RS sequence may be indicated among them through dynamic signaling. Such dynamic signaling may be reinterpreted as adding or substituting dynamic signaling to or for the original purpose of a specific bit(s) of DCI. Alternatively, for dynamic signaling, a new bit(s) may be additionally defined in DCI.

Embodiment 5

In Embodiments 1 to 4, when an RS parameter set of PUSCH/PUCCH/SRS includes or defines A (e.g., $\Delta_{ss}^{PUSCH\_UE}(s)$, $\Delta_{ss}^{PUCCH\_UE}(s)$ and/or $\Delta_{ss}^{SRS\_UE}(s)$) for a corresponding channel/signal, the $\Delta_{ss}$ value may be configured to one of 0 to 29.

Embodiment 6

The current embodiment relates to a method for UE-specifically configuring a VCI for determining a base sequence of PUSCH/PUCCH/SRS and/or a CS hopping pattern, independently for each of the PUSCH, the PUCCH and the SRS or for a partial group thereof.

For example, parameter sets of {VCI_PUSCH, VCI_PUCCH, VCI_SRS} may be provided to a specific UE through RRC signaling.

If the PUSCH is supported to be selectively directed to a plurality of RPs (e.g., if dynamic switching among a plurality of DMRS configurations is supported), VCI_PUSCH among the UE-specific parameter sets may be configured and signaled in the form of {VCI_PUSCH$_1$, ... , VCI_PUSCH$_L$}.

If the PUCCH is supported to be selectively directed to a plurality of RPs or if the VCI is allowed to apply a different value per a PUCCH format (group), VCI_PUCCH among the UE-specific parameter sets may be configured and signaled in the form of {VCI_PUCCH$_1$, VCI_PUCCH$_M$}.

If the SRS is supported to be selectively directed to a plurality of RPs, VCI_SRS among the UE-specific parameter sets may be configured and signaled in the form of {VCI_SRS$_1$, ... , VCI_SRS$_N$}.

Here, the range of the VCI_PUSCH, VCI_PUCCH and/or VCI_SRS value may be given as 0 to 509 as described above in Embodiment 2.

Embodiment 6-A

When dynamic switching among a plurality of PUSCH DMRS configurations is supported, if, for example, 2 VCIs are necessary for a PUSCH, RS parameter sets may be configured and signaled in the form of {VCI_PUSCH$_1$, VCI_PUSCH$_2$, VCI_PUCCH, VCI_SRS}.

If an RS parameter set is defined to include a plurality of VCIs and $\Delta_{ss}$ values and $\Delta_{ss}$ is additionally configured for each VCI, the RS parameter set may be configured and signaled in the form of {VCI_PUSCH$_1$, $\Delta_{ss1}$, VCI_PUSCH$_2$, $\Delta_{ss2}$}. In this case, since a sequence shift pattern is determined based on VCI and $\Delta_{ss}$, the range of VCI_PUSCH may be configured to 0 to 503.

If a PUCCH is configured to be directed to a single RP only, VCI_PUCCH may be configured to use specific VCI_PUSCH$_n$. For example, if a first VCI configured for the PUSCH is configured to be used for the PUCCH, VCI_PUCCH=VCI_PUSCH$_1$ may be configured or pre-defined.

If an RS parameter set is defined to include a plurality of VCIs and $\Delta_{ss}$ values and common A is configured for the VCIs, the RS parameter set may be configured and signaled in the form of {VCI_PUSCH$_l$, $\Delta_{ss1}$, VCI_PUSCH$_2$}. For example, if a first VCI configured for the PUSCH is configured to be used for the PUCCH, VCI_PUCCH=VCI_PUSCH$_1$ may be configured or pre-defined.

If an RS parameter set is defined to include a plurality of VCIs and $\Delta_{ss}$ values and $\Delta_{ss}$ is applied to some VCIs and not to the other VCIs, the RS parameter set may be configured and signaled in the form of {VCI_PUSCH$_1$, $\Delta_{ss1}$, VCI_PUSCH$_2$}. For example, if a first VCI configured for the PUSCH is configured to be used for the PUCCH, VCI_PUCCH=VCI_PUSCH$_1$ may be configured or pre-defined. Here, $\Delta_{ss1}$ may be pre-defined to be applied to VCI_PUSCH$_1$ only.

Embodiment 6-B

If a VCI is applied to a PUSCH but not is not changed for a PUCCH (or if a legacy PCI is applied to the PUCCH), an RS parameter set may be configured and signaled in the form of {VCI_PUSCH$_1$}. Here, as described above in Embodiment 2, the range of VCI_PUSCH$_1$ may be configured to 0 to 509. As such, since VCI_PUCCH=PCI, a legacy operation for generating a PUCCH DMRS sequence is not changed.

However, if the VCI is applied to the PUCCH but is not changed for the PUSCH (or if a legacy PCI is applied to the PUSCH), an RS parameter set may be configured and signaled in the form of {VCI_PUCCH}.

When the RS parameter set for the PUSCH is configured to include VCI and $\Delta_{ss}$ (i.e., {VCI_PUSCH$_l$, $\Delta_{ss1}$}) and then signaled, a specific bit(s) indicating whether the signaled VCI is applied to the PUCCH may be defined and signaled. That is, when only the VCI for the PUSCH (e.g., VCI_PUSCH$_1$) is signaled, information indicating whether VCI_PUCCH=VCI_PUSCH$_1$ is configured may be defined and signaled. When the information is defined to have a 1-bit size, for example, if the bit value is 0, this may indicate that the signaled VCI is applied to the PUSCH only. If the bit value is 1, this may indicate that the signaled VCI is applied to both the PUSCH and the PUCCH.

Although the RS parameter set for the PUSCH includes 2 VCIs in the above embodiments, the scope of the present invention is not limited thereto. That is, the RS parameter set may be extended to 3 or more RS parameters and the RS parameters may also be applied to the PUCCH and/or the SRS according to the above-described methods (e.g., case of one or more VCIs only, case of one or more VCIs and $\Delta_{ss}$ values, case of individual/common $\Delta_{ss}$, etc.) when one or more RS parameter sets are configured and signaled for the PUCCH and/or the SRS. Further, whether a parameter set for any one type RS among PUSCH DMRS/PUCCH DMRS/SRS is equally applied to the other type RSs may be configured.

Embodiment 7

A method for configuring and signaling an RS parameter set for a UL RS (e.g., PUSCH DMRS/PUCCH DMRS/SRS) has been mainly described above in Embodiments 1 to 6. Embodiment 7 describes a method for configuring and signaling an RS parameter set of a DL RS (e.g., CSI-RS and/or UE-specific RS). Although the following description is focused on the CSI-RS, the same principle may be equally applied to the UE-specific RS.

As described above in relation to Equations 2 and 4, according to operation of the legacy wireless communication system, an initial value $c_{init}$ for generating a DL RS sequence is determined based on a PCI (i.e., $N_{ID}^{cell}$ of a serving cell). The present invention proposes a method for correctly detecting and receiving a DL RS transmitted from a cell other than a serving cell, by a CoMP UE using a VCI instead of a PCI to correctly support CoMP operation. Information about an RS parameter set including the VCI for generating a DL RS may be provided to the UE through higher layer signaling. For example, in the case of CSI-RS, the RS parameter set including the VCI may be provided to the UE through RRC signaling about CSI-RS configuration.

Although an RS parameter set including a VCI and the like for a DL RS can be explicitly signaled to a UE as described above, the RS parameter set applied to the DL RS may be indirectly determined based on an RS parameter set for a UL RS (e.g., PUSCH/PUCCH/SRS). That is, an RS parameter set may be configured independently for each of a PUSCH DMRS, a PUCCH DMRS, an SRS, a CSI-RS and a UE-specific RS. Alternatively, by configuring a dependent relationship (or mapping relationship) among the PUSCH DMRS, the PUCCH DMRS, the SRS, the CSI-RS and the UE-specific RS, a parameter for one type RS may be applied as a parameter for one or more other type RSs (i.e., common RS parameter). As such, a RS parameter set per an RS type or per an RS type group may be configured through, for example, UE-specific RRC signaling, and a mapping relationship among RS parameter sets for different type RSs (or RS groups) may be configured.

For clarity of explanation, the following description is focused on a case in which an RS parameter set directly configured through UE-specific RRC signaling or indirectly configured (i.e., determined based on a mapping relationship with an RS parameter set for another type RS) includes one or more VCIs. However, the scope of the present invention is not limited thereto and the principle of the present invention described below may be equally applied to a case in which as or various parameters proposed in Embodiment 3 are include in the RS parameter set.

For example, RS parameters for each RS type may be defined as described below. $\{VCI\_PUSCH_1, \ldots, VCI\_PUSCH_L\}$ may be configured for a PUSCH DMRS, $\{VCI\_PUCCH_1, \ldots, VCI\_PUCCH_M\}$ may be configured for a PUCCH DMRS, $\{VCI\_SRS_1, \ldots, VCI\_SRS_N\}$ may be configured for an SRS, $\{VCI\_X_1, \ldots, VCI\_X_P\}$ may be configured for a CSI-RS, and $\{VCI\_Y_1, \ldots, VCI\_Y_Q\}$ may be configured for a UE-specific RS. Here, $L \geq 1$, $M \geq 1$, $N \geq 1$, $P \geq 1$, and $Q \geq 1$.

As described above, basically, VCIs for each RS type may be configured independently from those of another RS type without dependency therebetween.

Embodiment 7-a

A one to one mapping relationship may be partially or entirely configured between a VCI(s) for a PUSCH and a VCI(s) for a PUCCH. As such, only the VCI for any one of the PUSCH and the PUCCH may be provided through higher layer signaling, and the VCI for the other one may be determined based on the one to one mapping relationship. That is, the VCI for the PUSCH and the VCI for the PUCCH may be configured to have the same value. For example, a relationship of $VCI\_PUSCH_1 = VCI\_PUCCH_1$, $VCI\_PUSCH_2 = VCI\_PUCCH_2$, ... may be established.

Embodiment 7-b

A one to one mapping relationship may be partially or entirely configured between a VCI(s) for an SRS and a VCI(s) for a PUCCH. As such, only the VCI for any one of the SRS and the PUCCH may be provided through higher layer signaling, and the VCI for the other one may be determined based on the one to one mapping relationship. That is, the VCI for the SRS and the VCI for the PUCCH may be configured to have the same value. For example, a relationship of $VCI\_SRS_1 = VCI\_PUCCH_1$, $VCI\_SRS_2 = VCI\_PUCCH_2$, ... may be established. This scheme easily supports an operation for applying a base sequence of a PUCCH equally to a base sequence of an SRS (see the paragraph above Equation 18) and corresponds to extension of a parameter set (e.g., VCI) for generating a base sequence into a plurality of parameter sets.

Embodiment 7-c

A one to one mapping relationship may be partially or entirely configured between a VCI(s) for an SRS and a VCI(s) for a PUSCH. As such, only the VCI for any one of the SRS and the PUSCH may be provided through higher layer signaling, and the VCI for the other one may be determined based on the one to one mapping relationship. That is, the VCI for the SRS and the VCI for the PUSCH may be configured to have the same value. For example, a relationship of $VCI\_SRS_1 = VCI\_PUSCH_1$, $VCI\_SRS_2 = VCI\_PUSCH_2$, ... may be established. This scheme easily supports a Power Control (PC) operation of an SRS which is tied with a PUSCH PC operation for link adaptation of the PUSCH by a difference of a predetermined constant value (e.g., $P_{SRS\_offset}$) and is characterized in that, when a plurality of PUSCH VCIs are given, a plurality of SRS VCIs transmittable to corresponding target RPs are given due to the tied PC therebetween.

Embodiment 7-d

A one to one mapping relationship may be partially or entirely configured among a VCI(s) for an SRS, a VCI(s) for a PUSCH and a VCI(s) for a PUCCH. As such, only the VCI for any one of the SRS, the PUSCH and the PUCCH may be provided through higher layer signaling, and the VCIs for the other two may be determined based on the one to one mapping relationship. That is, the VCI for the SRS, the VCI for the PUSCH and the VCI for the PUCCH may be configured to have the same value. For example, a relationship of $VCI\_SRS_1 = VCI\_PUSCH_1 = VCI\_PUCCH_1$, $VCI\_SRS_2 = VCI\_PUSCH_2 = VCI\_PUCCH_2$, ... may be established. This scheme easily supports a legacy operation by which the same base sequence is used for the SRS and the PUCCH and also supports tied PC between the PUSCH and the SRS.

Embodiment 7-e

In Embodiments 7-a to 7-d, a one to one mapping relationship of a VCI(s) for a CSI-RS may be additionally defined. For example, a relationship of $VCI\_PUSCH_1 = VCI\_PUCCH_1 = VCI\_X_1$, $VCI\_PUSCH_2 = VCI\_PUCCH_2 = VCI\_X_2$, ... may be established in Embodiment 7-a, a relationship of $VCI\_SRS_1 = VCI\_PUCCH_1 = VCI\_X_1$, $VCI\_SRS_2 = VCI\_PUCCH_2 = VCI\_X_2$, ... may be established in Embodiment 7-b, a relationship of $VCI\_SRS_1=VCI\_PUSCH_1=VCI\_X_1$, $VCI\_SRS_2=VCI\_PUSCH_2=VCI\_X_2$, ... may be established in Embodiment 7-c, and a relationship of $VCI\_SRS_1=VCI\_PUSCH_1=VCI\_PUCCH_1=VCI\_SRS_2=VCI\_PUSCH_2=VCI\_PUCCH_2=VCI\_X_2$, ... may be established in Embodiment 7-d. In addition, a relationship of $VCI\_SRS_1=VCI\_X_1$, $VCI\_SRS_2=VCI$ may be established in Embodiments 7-a to 7-d.

This scheme may correspond to a case in which CSI-RS based Open-Loop Power Control (OLPC) is applied to a cell to which the SRS, the PUSCH and/or the PUCCH are commonly directed, using a CSI-RS configuration for applying a VCI corresponding to the cell. That is, OLPC for the SRS, the PUSCH and/or the PUCCH is a scheme for determining uplink Tx power by a UE based on indirect information without any direct feedback from an eNB. A reference factor for UL OLPC is a pathloss value, and this can be regarded that the factor is determined based on a value calculated using the CSI-RS which is a DL RS from the cell corresponding to the VCI. That is, this can be regarded that UL PC and DL PC are tied or that a UL RP and a DL TP correspond to the same point. The above description is purely exemplary and the mapping relationship among the VCIs for the SRS, the PUSCH, the PUCCH and the CSI-RS may be defined for another purpose.

Embodiment 7-f

In Embodiments 7-a to 7-e, in addition to the RS parameter set for the PUSCH (e.g., $VCI\_PUSCH$, $\Delta_{ss}$, $n_{DMRS}^{(1)}$, $\beta_{PUSCH}$, etc. in Embodiment 3-C), a CS hopping initialization parameter (i.e., $c_{init}^{CSH}$) paired with each PUSCH VCI(s) may be provided through UE-specific RRC signaling. For example, an RS parameter set may be configured and signaled in the form of $\{(VCI\_PUSCH_1, c_{init}^{CSH}{}_1), (VCI\_PUSCH_2, c_{init}^{CSH}{}_2), \ldots, (VCI\_PUSCH_L, c_{init}^{CSH}{}_L)\}$. In this case, $c_{init}^{CSH}$ may be configured independently from the paired VCI_PUSCH. That is, a base sequence index and a CS hopping pattern may independently operate.

Further, each of $c_{init}^{CSH}{}_1, c_{init}^{CSH}{}_2, \ldots$ may be allowed to be concurrent with an independent pseudo-random sequence $n_{PN}(n_s)$ in parallel. That is, $n_{PN,1}(n_s)$ generated based on $c_{init}^{CSH}{}_1$ may be present and, at the same time, $n_{PN,2}(n_s)$ generated based on $c_{init}^{CSH}{}_2$ may be present. Likewise, two or more $c_{init}^{CSH}$ values may be concurrent with two or more $n_{PN}(n_s)$ values in parallel.

Alternatively, a single pseudo-random sequence $n_{PN}(n_s)$ may be present for different $c_{init}^{CSH}{}_1$, $c_{init}^{CSH}{}_2$.

Such a pseudo-random sequence generator is initialized to a corresponding $c_{init}^{CSH}$ at the beginning of each radio frame.

If a specific value (including one or more $c_{init}^{CSH}$ values) among $c_{init}^{CSH}{}_1$, $c_{init}^{CSH}{}_2$, ... values is signaled in the middle of the radio frame (e.g., when a slot index is not 0), instead of $n_{PN}(n_s)$ calculated before the signaled value is received, $n_{PN}(n_s)$ calculated again at a current time II, on the assumption that the specific value is applied when the radio frame starts may be applied.

Alternatively, even when the specific value of $c_{init}^{CSH}$ is signaled in the middle of the radio frame, the previously provided $c_{init}^{CSH}$ value may be continuously used without applying the newly received specific value, and then $n_{PN}(n_s)$ may be calculated by applying the received specific value when a next radio frame starts.

In Embodiments 7-a to 7-e, $\Delta_{ss}$, $\Delta_{shift}^{PUCCH}$, $\delta_{offset}^{PUCCH}$, $\beta_{PUCCH}$ and/or $N_{PUCCH\_UE}^{(1)}$ paired with the PUCCH VCI(s) in Embodiment 3-A may be provided through UE-specific RRC signaling as the RS parameter set for the PUCCH. For example, the RS parameter set may be configured and signaled in the form of $\{(VCI\_PUCCH_1, \Delta_{shift}^{PUCCH}{}_1, \delta_{offset}^{PUCCH}{}_1, \beta_{PUCCH\ 1}, N_{PUCCH}^{(1)}{}_1), \ldots, (VCI\_PUCCH_M, \Delta shift^{PUCCH}{}_M, \delta_{offset}^{PUCCH}{}_M, \beta_{PUCCH\ M}, N_{PUCCH}^{(1)}{}_M)\}$.

In Embodiments 7-a to 7-e, $\Delta_{ss}$, $n_{SRS}^{cs}$, $\beta_{SRS}$, $N_{ap}$, $k_0^{(p)}$, $C_{SRS}$, $B_{SRS}$, srsMaxUpPts, $\bar{k}_{TC}$, $n_b$, $n_{hf}$, $b_{hop}$, $T_{SRS}$, $T_{offset}$, $T_{SFC}$ and/or $\Delta_{SFC}$ paired with the SRS VCI(s) in Embodiment 3-B may be provided through UE-specific RRC signaling as the RS parameter set for the SRS. For example, the RS parameter set may be configured and signaled in the form of $\{(VCI\_SRS_1, \Delta_{ss1}, n_{SRS}^{cs}{}_1, \beta_{SRS\ 1}, N_{ap\ 1}, k_0^{(p)}{}_1, M_{sc,b}^{RS}{}_1, C_{SRS1}, B_{SRS1}, \text{srsMaxUpPts}_1, \bar{k}_{TC^1}, n_{b1}, n_{hf\ 1}, b_{hop1}, T_{SRS1}, T_{offset1}, T_{SFC1}, \Delta_{SFC1}), \ldots, (VCI\_SRS_N, \Delta_{ssN}, n_{SRS}^{cs}{}_N, \beta_{SRS\ N}, N_{ap\ N}, k_0^{(p)}{}_N, M_{sc,b}^{RS}{}_N, C_{SRSN}, B_{SRSN}, \text{srsMaxUpPts}_N, \bar{k}_{TC^N}, n_{bN}, n_{hf\ N}, b_{hopN}, T_{SRSN}, T_{offsetN}, T_{SFCN}, \Delta_{SFCN})\}$.

Embodiment 7-g

An SRS includes a UL-CSI acquisition SRS and a DL-CSI acquisition SRS. The DL-CSI SRS may follow a PC process not tied with PUSCH PC. A VCI(s) applied to this DL-CSI SRS may be $\{VCI\_SRS^{DL}{}_1, \ldots, VCI\_SRS^{DL}{}_Q\}$ (where $Q \geq 1$).

In this case, a one to one mapping relationship may be partially or entirely configured between a $VCI\_SRS^{DL}(s)$ for the DL-CSI SRS and a VCI X(s) for a CSI-RS. As such, only the VCI for any one of the DL-CSI SRS and the CSI-RS may be provided through higher layer signaling, and the VCI for the other one may be determined based on the one to one mapping relationship. That is, the VCI for the DL-CSI SRS and the VCI for the CSI-RS may be configured to have the same value. For example, a relationship of $VCI\_SRS^{DL}{}_1=VCI\_X_1$, $VCI\_SRS^{DL}{}_2=VCI\_X_2$, ... may be established.

Further, when $VCI\_X_1, \ldots VCI\_X_P$ are already configured as in Embodiment 7-e, a one to one mapping relationship may be configured without overlapping between an additional VCI X(s) for the CSI-RS and the $VCI\_SRS^{DL}$. For example, a relationship of $VCI\_SRS^{DL}{}_1=VCI\_X_{P+1}$, $VCI\_SRS^{DL}{}_2=VCI\_X_{P+2}$, may be established.

Alternatively, when $VCI\_X_1, \ldots VCI\_X_P$ are already configured as in Embodiment 7-e, parts thereof and the $VCI\_SRS^{DL}$ may be configured to have the same values. Alternatively, parts of $VCI\_X_1, \ldots VCI\_X_P$ and the $VCI\_SRS^{DL}$ may be configured to have the same values, and the other parts of $VCI\_SRS^{DL}$ may be configured to have the same values as $VCI\_X_{P+1}, VCI\_X_{P+2}, \ldots$.

When the $VCI\_SRS^{DL}$ is configured to have a one to one mapping relationship with and the same values as the VCI_X as described above, only the mapping relationship may be configured between the VCI_X and the $VCI\_SRS^{DL}$ and the $VCI\_SRS^{DL}$ may not be explicitly signaled. This scheme may correspond to a case in which CSI-RS based OLPC is applied to a corresponding DL-CSI SRS based on a CSI-RS configuration using a specific VCI_X.

Although the above various embodiments have been described separately for clarity of explanation, two or more of the embodiments may be applied in combination.

Embodiment 8

As proposed above in the previous embodiments, a VCI among parameters for generating a base sequence of PUSCH DMRS/PUCCH DMRS, which are transmitted through UE-specific higher layer signaling, may be denoted by $n_{ID}^{RS}$. If $n_{ID}^{RS}$ is configured through higher layer signaling, a group hopping pattern $f_{gh}$, a sequence shift pattern $f_{ss}$, etc. are generated using corresponding values. If no $n_{ID}^{RS}$ is provided through higher layer signaling, a PCI (i.e., $N_{ID}^{cell}$) may be used as in a legacy operation (see Equations 10 to 13 and 17).

Specifically, a group hopping pattern $f_{gh}(n_s)$ may be given as shown in Equation 7 equally for the PUSCH and the PUCCH. Here, in the pseudo-random sequence c(i) of Equation 7, the pseudo-random sequence generator may be initialized to $c_{init}$ as shown in Equation 22 at the beginning of each radio frame.

$$c_{init} = \left\lfloor \frac{n_{ID}^{RS}}{30} \right\rfloor \quad \text{[Equation 22]}$$

In Equation 22, $n_{ID}^{RS}$ is determined as $N_{ID}^{cell}$ if no value for $n_{ID}^{RS}$ is configured by a higher layer, or if a temporary C-RNTI is used to transmit the most recent UL-related DCI for a transport block associated with corresponding PUSCH transmission. Otherwise (e.g., if a value of $n_{ID}^{RS}$ is configured by a higher layer), the configured $n_{ID}^{RS}$ value may be applied.

Meanwhile, the sequence shift pattern $f_{ss}$ may be defined differently for the PUCCH and the PUSCH.

In the case of PUCCH, a sequence shift pattern $f_{ss}^{PUCCH}$ may be defined as shown in Equation.

$$f_{ss}^{PUCCH} = n_{ID}^{RS} \bmod 30 \quad \text{[Equation 23]}$$

In Equation 23, $n_{ID}^{RS}$ is determined as $N_{ID}^{cell}$ if no value for $n_{ID}^{RS}$ is configured by a higher layer. Otherwise (e.g., if a value of $n_{ID}^{RS}$ is configured by a higher layer), the configured $n_{ID}^{RS}$ value may be applied.

In the case of PUSCH, $f_{ss}^{PUSCH}$ defined as shown in Equation 12 if no value for $n_{ID}^{RS}$ is configured by a higher layer, or if a temporary C-RNTI is used to transmit the most recent UL-related DCI for a transport block associated with corresponding PUSCH transmission. Otherwise (e.g., if a value of $n_{ID}^{RS}$ is configured by a higher layer), $f_{ss}^{PUSCH}$ may be determined as shown in Equation 24.

$$f_{ss}^{PUSCH} = n_{ID}^{RS} \bmod 30 \quad \text{[Equation 24]}$$

In the case of SRS, a legacy operation follows a PUCCH sequence group number to generate a base sequence thereof (see the paragraph above Equation 18). This means that the base sequence is generated using a PCI (i.e., $N_{ID}^{cell}$). According to the present invention, in a specific condition, e.g., when a VCI ($n_{ID}^{RS}$) for the PUSCH or the PUCCH is configured through higher layer signaling, the SRS sequence may be generated using the VCI instead of the PCI. Here, a VCI for the SRS may be separately configured through UE-specific higher layer signaling, or configured to use another VCI (e.g., a VCI for a PUSCH, a VCI for a PUCCH, a VCI for a specific PUCCH format or a VCI configured for PUCCH format 1a/1b triggered by an ePDCCH for ACK/NACK transmission).

For example, if no value for $n_{ID}^{RS}$ for the PUSCH or the PUCCH is configured by a higher layer, or if a temporary C-RNTI is used to transmit the most recent UL-related DCI for a transport block associated with corresponding PUSCH transmission, SRS sequence generation may be performed according to the legacy operation (see the paragraph above Equation 18, Equation 18 and the paragraph below Equation 18).

Otherwise (e.g., if a value of $n_{ID}^{RS}$ for the PUSCH is configured by a higher layer), a base sequence index u may be generated using the VCI for the PUSCH (e.g., ranging from 0 to 509 as described above in Embodiment 2). Further, if sequence hopping is enabled, the PCI among parameters used to determine a base sequence number v may be replaced with the VCI for the PUSCH. Even in the case of $f_{ss}^{PUSCH}$, a result calculated using the VCI for the PUSCH as shown in Equation 24 may be used for SRS sequence generation. Alternatively, when the VCI for the PUCCH is used for SRS sequence generation, u and v may be determined using the VCI for the PUCCH.

If the VCI for the SRS is signaled in addition to the VCI for the PUSCH/the VCI for the PUCCH, SRS sequence generation may be defined as described below.

For SRS sequence generation, if VCI_SRS (e.g., ranging from 0 to 509) is configured by a higher layer, a group hopping pattern $f_{gh}$ and a sequence shift pattern $f_{ss}$ may be defined as shown in Equation 25.

$$u = (f_{gh}(n_s) + f_{ss\_SRS}) \bmod 30 \quad \text{[Equation 25]}$$

In Equation 25, an initialization parameter of $f_{gh}(n_s)$ may be defined as $c_{init} = \text{floor}(\text{VCI\_SRS}/30)$, and $f_{ss\_SRS} = \text{VCI\_SRS} \bmod 30$ may be defined.

Further, an initialization parameter $c_{init}$ of a sequence hopping pattern may be defined as shown in Equation 26.

$$c_{init} = \left\lfloor \frac{n_{ID}^{cell}}{30} \right\rfloor \cdot 2^5 + f_{ss\_SRS} \quad \text{[Equation 26]}$$

In Equation 26, $n_{ID}^{cell}$ is VCI_SRS.

Alternatively, the initialization parameter $c_{init}$ of the sequence hopping pattern may be defined as shown in Equation 27.

$$c_{init} = \left(\left\lfloor \frac{n_{ID}^{cell}}{30} \right\rfloor \cdot 2^5 + (n_{ID}^{cell} \bmod 30) + \Delta_{ss}\right) \bmod 30 \quad \text{[Equation 27]}$$

In Equation 27, $n_{ID}^{cell}$ is VCI_SRS. Further, $\Delta_{ss} \in \{0, 1, \ldots, 29\}$ may be defined as a parameter cell-specifically given by a corresponding DL serving cell.

Alternatively, the base sequence number u may be generated using a VCI for a PUCCH, a VCI for a specific PUCCH format or a VCI separately configured for PUCCH format 1 a/1b triggered by an ePDCCH for ACK/NACK transmission.

Further, the above-described proposals of the present invention about an operation for performing SRS sequence generation using a VCI for a PUSCH or a VCI for a PUCCH, or using a VCI for an SRS may be applied individually for a periodic SRS (P-SRS) configuration and an aperiodic SRS (A-SRS) configuration. For example, an independent VCI(s) may be configured for each of a plurality of SRS configurations (one P-SRS configuration may be present, and one or more A-SRS configurations may be present for each DCI format), a commonly applicable VCI(s) may be configured for some SRS configurations, or a default ID (e.g., PCI) may be configured for the SRS configurations.

In this case, if the VCI for the PUSCH or the VCI for the PUCCH is signaled by a higher layer, determination and application of a VCI to be used for SRS sequence generation may be enabled per an SRS configuration. Alternatively, determination and application of a VCI to be used for SRS sequence generation may be enabled through individual signaling or according to a separate rule for each SRS configuration.

A description is now given of specific embodiments of an operation for determining a parameter to be used for SRS sequence generation, and an operation for generating an SRS sequence using the parameter, based on the above description.

Embodiment 8-A

If both VCI_PUSCH (e.g., ranging from 0 to 509) and VCI_PUCCH (e.g., ranging from 0 to 503) are configured through UE-specific higher layer signaling, an SRS sequence may be generated as described below.

For SRS sequence generation, a group hopping base sequence number is defined as $u=(f_{gh}(n_s)+f_{ss})\bmod 30$. Here, an initialization parameter of a group hopping pattern $f_{gh}(n_s)$ is defined using VCI_PUCCH as $c_{init}=\text{floor}(\text{VCI\_PUCCH}/30)$, and $f_{ss}=\text{VCI\_PUCCH}\bmod 30$ is defined.

For SRS sequence generation, an initialization parameter of a sequence hopping pattern is defined using VCI_PUSCH for the PUSCH as $c_{init}=\{\text{floor}(\text{VCI\_PUSCH}/30)\}2^5+f_{ss\_PUSCH}$, and $f_{ss\_PUSCH}=\text{VCI\_PUSCH}\bmod 30$ is defined.

Here, VCI_PUCCH may be a VCI commonly applied to all PUCCH formats. Alternatively, VCI_PUCCH may be a VCI commonly applied only to one or some PUCCH formats. Otherwise, VCI_PUCCH may be a VCI applied to a specific PUCCH format(s) triggered by a legacy PDCCH or an ePDCCH for ACK/NACK transmission.

Embodiment 8-A-i

VCI_PUCCH applied in Embodiment 8-A may be restricted to a VCI configured to be used only for a specific PUCCH format(s) (or only for PUCCH format 1a/1b triggered by an ePDCCH for ACK/NACK transmission). A description is now given of specific embodiments thereof.

Embodiment 8-A-i-a

VCI_PUCCH1a1b3 (e.g., ranging from 0 to 503) for dynamic PUCCH format 1a/1b/3 and VCI_PUCCH1a1b22a2b (e.g., ranging from 0 to 509) for semi-static PUCCH format 1a/1b/2/2a/2b may be configured through UE-specific RRC signaling. In this case, SRS sequence generation may be defined as described below.

If both VCI_PUSCH (e.g., ranging from 0 to 509) and VCI_PUCCH1a1b3 (e.g., ranging from 0 to 503) are configured through UE-specific higher layer signaling, an SRS sequence may be generated as described below.

For SRS sequence generation, a group hopping base sequence number is defined as $u=(f_{gh}(n_s)+f_{ss})\bmod 30$. H. an initialization parameter of a group hopping pattern $f_{gh}(n_s)$ is defined using VCI_PUCCH1a1b3 as $c_{init}=\text{floor}(\text{VCI\_PUCCH1a1b3}/30)$, and $f_{ss}=\text{VCI\_PUCCH1a1b3}\bmod 30$ is defined.

For SRS sequence generation, an initialization parameter of a sequence hopping pattern is defined using VCI_PUSCH for the PUSCH as $c_{init}=\{\text{floor}(\text{VCI\_PUSCH}/30)\}2^5+f_{ss\_PUSCH}$, and $f_{ss\_PUSCH}=\text{VCI\_PUSCH}\bmod 30$ is defined.

Embodiment 8-A-i-b

In the SRS sequence generation method defined in Embodiment 8-A-i-a, VCI_PUCCH3 for PUCCH format 3 and VCI_PUCCH1a1b for PUCCH format 1a/1b may be may be separately configured through UE-specific RRC signaling. In this case, SRS sequence generation may be defined as described below.

If both VCI_PUSCH (e.g., ranging from 0 to 509) and VCI_PUCCH1a1b (e.g., ranging from 0 to 503) are configured through UE-specific higher layer signaling, an SRS sequence may be generated as described below.

For SRS sequence generation, a group hopping base sequence number is defined as $u=(f_{gh}(n_s)+f_{ss})\bmod 30$. Here, an initialization parameter of a group hopping pattern $f_{gh}(n_s)$ is defined using VCI_PUCCH1a1b as $c_{init}=\text{floor}(\text{VCI\_PUCCH1a1b}/30)$, and $f_{ss}=\text{VCI\_PUCCH1a1b}\bmod 30$ is defined.

For SRS sequence generation, an initialization parameter of a sequence hopping pattern is defined using VCI_PUSCH for the PUSCH as $c_{init}=\{\text{floor}(\text{VCI\_PUSCH}/30)\}2^5+f_{ss\_PUSCH}$, and $f_{ss\_PUSCH}=\text{VCI\_PUSCH}\bmod 30$ is defined.

Embodiment 8-A-i-c

As in Embodiment 8-A-i-b, VCI_PUCCH3 for PUCCH format 3 and VCI_PUCCH1a1b for PUCCH format 1a/1b may be may be separately configured through UE-specific RRC signaling. In this case, SRS sequence generation may be defined as described below.

If both VCI_PUSCH (e.g., ranging from 0 to 509) and VCI_PUCCH3 (e.g., ranging from 0 to 503) are configured through UE-specific higher layer signaling, an SRS sequence may be generated as described below.

For SRS sequence generation, a group hopping base sequence number is defined as $u=(f_{gh}(n_s)+f_{ss})\bmod 30$. Here, an initialization parameter of a group hopping pattern $f_{gh}(n_s)$ is defined using VCI_PUCCH3 as $c_{init}=\text{floor}(\text{VCI\_PUCCH3}/30)$, and $f_{ss}=\text{VCI\_PUCCH3}\bmod 30$ is defined.

For SRS sequence generation, an initialization parameter of a sequence hopping pattern is defined using VCI_PUSCH for the PUSCH as $c_{init}=\{\text{floor}(\text{VCI\_PUSCH}/30)\}2^5+f_{ss\_PUSCH}$, and $f_{ss\_PUSCH}=\text{VCI\_PUSCH}\bmod 30$ is defined.

Embodiment 8-A-i-d

VCI_PUCCH1a1b_ePDCCH for PUCCH format 1a/1b triggered by an ePDCCH for ACK/NACK transmission may be configured through UE-specific RRC signaling separately from other VCIs. In this case, SRS sequence generation may be defined as described below.

If both VCI_PUSCH (e.g., ranging from 0 to 509) and VCI_PUCCH1a1b_ePDCCH (e.g., ranging from 0 to 503) are configured through UE-specific higher layer signaling, an SRS sequence may be generated as described below.

For SRS sequence generation, a group hopping base sequence number is defined as $u=(f_{gh}(n_s)+f_{ss})\bmod 30$. Here, an initialization parameter of a group hopping pattern $f_{gh}(n_s)$ is defined using VCI_PUCCH1a1b_ePDCCH as $c_{init}=\text{floor}(\text{VCI\_PUCCH1a1b\_ePDCCH}/30)$, and $f_{ss}=\text{VCI\_PUCCH1a1b\_ePDCCH}\bmod 30$ is defined.

For SRS sequence generation, an initialization parameter of a sequence hopping pattern is defined using VCI_PUSCH for the PUSCH as $c_{init}=\{\text{floor}(\text{VCI\_PUSCH}/30)\}2^5+f_{ss\_PUSCH}$, and $f_{ss\_PUSCH}=\text{VCI\_PUSCH}\bmod 30$ is defined.

Only one of the various methods of Embodiment 8-A-i may be defined and applied all the time, or all or a part of the methods proposed in Embodiments 8-A-i-a to 8-A-i-d may be enabled/disabled through higher layer signaling or dynamic signaling.

Embodiment 8-A-ii

In Embodiment 8-A, a plurality of VCI_PUSCH values may be present (e.g., VCI_PUSCH(1), VCI_PUSCH (2), . . . ). When a plurality of VCI_PUSCH values are UE-specifically configured as described above, VCI_PUSCH(n) may be applied among them. For example, in Embodiments 8-A-i-a to 8-A-i-d, VCI_PUSCH may be replaced with VCI_PUSCH(n) and a repeated description therebetween is not given here. Here, information indicating whether to use a certain VCI_PUSCH(n) value for SRS sequence generation among a plurality of VCI_PUSCH values signaled by a higher layer may be provided through higher layer signaling or dynamic signaling. Moreover, a single VCI_PUSCH(n) value to be used for SRS sequence generation may be indicated among the VCI_PUSCH values, or a plurality of VCI_PUSCH(n) values may be indicated to enable generation of a plurality of SRS sequences.

Embodiment 8-B

In Embodiment 8-A, only VCI_PUSCH (e.g., ranging from 0 to 509) applied to a PUSCH DMRS may be configured through UE-specific RRC signaling. That is, a description is now given of an SRS sequence generation method in a case in which VCI_PUCCH is not separately signaled and VCI_PUSCH is signaled. For clarity of explanation, the following description is focused on one VCI_PUSCH value. However, the following description may be equally applied to a case in which a plurality of VCI_PUSCH values are signaled by a higher layer and one or more VCI_PUSCH(n) values among them are used for SRS sequences generation. Thus, generation of one or more SRS sequences may be enabled.

For SRS sequence generation, a group hopping base sequence number is defined as $u=(f_{gh}(n_s)+f_{ss})\mod 30$. Here, an initialization parameter of a group hopping pattern $f_{gh}(n_s)$ is defined using a PCI of a DL serving cell as $=\text{floor}(PCI/30)$, and $f_{ss}=PCI \mod 30$ is defined.

For SRS sequence generation, an initialization parameter of a sequence hopping pattern is defined using VCI_PUSCH for the PUSCH as $c_{init}=\{\text{floor}(VCI\_PUSCH/30)\}2^5+f_{ss\_PUSCH}$, and $f_{ss\_PUSCH}=VCI\_PUSCH \mod 30$ is defined.

Embodiment 8-C

In Embodiment 8-A, only VCI_PUCCH (e.g., ranging from 0 to 503) applied to a PUCCH DMRS may be configured through UE-specific RRC signaling. That is, a description is now given of an SRS sequence generation method in a case in which VCI_PUSCH is not separately signaled and VCI_PUCCH is signaled. For clarity of explanation, the following description is focused on one VCI_PUCCH value. However, if specific types of VCI_PUCCH (e.g., VCI_PUCCH1a1b3, VCI_PUCCH1a1b, VCI_PUCCH3 and VCI_PUCCH1a1b_ePDCCH) are configured through higher layer signaling as described above in Embodiments 8-A-i-a to 8-A-i-d, the following description may be equally applied to a case in which the specific types of VCI_PUCCH are used for SRS sequences generation.

For SRS sequence generation, a group hopping base sequence number is defined as $u=(f_{gh}(n_s)+f_{ss}) \mod 30$. Here, an initialization parameter of a group hopping pattern $f_{gh}(n_s)$ is defined using VCI_PUCCH as $c_{init}=\text{floor}(VCI\_PUCCH/30)$, and $f_{ss}=VCI\_PUCCH \mod 30$ is defined.

For SRS sequence generation, an initialization parameter of a sequence hopping pattern is defined using a PCI of a DL serving cell as $c_{init}=\{\text{floor}(PCI/30)\}2^5+f_{ss\_PUSCH}$, and $f_{ss\_PUSCH}=\{(PCI \mod 30)+\Delta_{ss}\} \mod 30$ is defined.

Embodiment 8-D

A description is now given of SRS sequence generation in a case in which $\Delta_{ss}$ (e.g., ranging from 0 to 29) is configured instead of VCI_PUSCH (e.g., ranging from 0 to 509) through higher layer signaling. In this case, it is assumed that VCI_PUCCH is signaled by a higher layer (particularly, case of Embodiment 8-B). In this case, in Embodiments 8-A to 8-C, the parameter VCI_PUSCH may be replaced with VCI_PUCCH. Further, $f_{ss\_PUSCH}$ defined in association with a sequence hopping pattern may be defined as $f_{ss\_PUSCH}=\{(VCI\_PUCCH \mod 30)+\Delta_{ss}\} \mod 30$.

Moreover, if specific types of VCI_PUCCH (e.g., VCI_PUCCH1a1b3, VCI_PUCCH1a1b, VCI_PUCCH3 and VCI_PUCCH1a1b_ePDCCH) are configured through higher layer signaling as described above in Embodiments 8-A-i-a to 8-A-i-d, the specific types of VCI_PUCCH may be used for SRS sequences generation. Further, if a plurality of $\Delta_{ss}$ values, e.g., $\Delta_{ss}(1)$, $\Delta_{ss}(2)$, . . . , are signaled instead of a plurality of VCI_PUSCH values by a higher layer, one or more $\Delta_{ss}(n)$ values among them may be used for SRS sequence generation and thus generation of one or more SRS sequences may be enabled.

Embodiment 8-E

The DL-CSI SRS sequence generation method described above at the beginning of Embodiment 8 may be defined to be triggered by a specific A-SRS configuration(s). In this case, a DL-CSI SRS sequence may be generated using a parameter included in an A-SRS configuration(s). For example, only VCI_PUCCH_ASRS (e.g., ranging from 0 to 503) used to calculate the initialization parameter of the group hopping pattern $f_{gh}(n_s)$, only VCI_PUSCH_ASRS (e.g., ranging from 0 to 509) used to calculate the initialization parameter of the sequence hopping pattern, or both VCI_PUCCH_ASRS and VCI_PUSCH_ASRS may be included in a specific A-SRS configuration(s). Here, instead of the VCI_PUSCH_ASRS parameter, $\Delta_{ss}$ (e.g., ranging from 0 to 29) may be used for signaling as described above in Embodiment 8-D.

As such, if VCI_PUCCH_ASRS and/or VCI_PUSCH_ASRS (or $\Delta_{ss}$) are included in the A-SRS configuration(s), it may be defined to preferentially apply VCI_PUCCH_ASRS and/or VCI_PUSCH_ASRS (or $\Delta_{ss}$) rather than already defined other parameters to generate and transmit an A-SRS sequence according to a corresponding A-SRS configuration.

Further, the A-SRS configuration(s) for the DL-CSI SRS may be defined to be tied with a CSI-RS configuration(s). In this case, in Embodiments 8-A to 8-D, VCI_PUCCH may be replaced with a CSI-RS sequence scrambling value (or VCI X) included in the CSI-RS configuration(s). If $\Delta_{ss}$ (e.g., ranging from 0 to 29) is included in the A-SRS configuration(s), VCI_PUCCH may be replaced with X as described above in Embodiment 8-D, and $f_{ss\_PUSCH}$ may be defined as $f_{ss\_PUSCH}=\{(X \mod 30)+\Delta_{ss}\} \mod 30$. In addition, $\Delta_{ss}$ may not be included in the A-SRS configuration(s) of the DL-CSI SRS, and it may be defined to apply $\Delta_{ss}$ of a DL serving cell. Alternatively, it may be defined to assume $\Delta_{ss}=0$, and this can be applicable only when a network has configured $\Delta_{ss}=0$ cell-specifically.

In addition, a parameter for the DL-CSI SRS may not be separately configured, SRS sequence generation for A-SRS transmission may be defined to be the same as SRS sequence generation for UL-CSI SRS transmission according to the method proposed in Embodiments 8-A to 8-D. That is, a general SRS (i.e., a UL-CSI acquisition SRS tied with PC of PUSCH with a predetermined difference value) sequence generation method may be equally applied as the SRS sequence generation method of the DL-CSI acquisition A-SRS. At this time, although Tx power of the DL-CSI SRS may be different from Tx power of the UL-CSI SRS, the same sequence generation method may be applied. In this case, a sequence of SRSs received from other legacy UEs received in the same band in a cell(s) to which the DL-CSI acquisition A-SRS is directed may not be orthogonally paired with the DL-CSI acquisition A-SRS. Even in this case, since the DL-CSI acquisition A-SRS is rarely transmitted compared to a general SRS, the A-SRS may be transmitted by forming orthogonal pairing with an SRS transmitted by an enhanced UE (i.e., UE operating according to 3GPP LTE Release 11 and subsequent releases) without supporting orthogonal pairing with an SRS of a legacy UE.

Although a method for generating and transmitting a sequence by configuring and applying an RS parameter set capable of efficiently supporting CoMP operation for a PUSCH DMRS, a PUCCH DMRS, an SRS (UL-CSI SRS and DL-CSI SRS), a CSI-RS and a UE-specific RS has been described above, the scope of the present invention is not limited there to and the principle of the present invention is also applicable to a method for generating and transmitting a sequence of other UL RSs and/or DL RSs.

Figure 13:
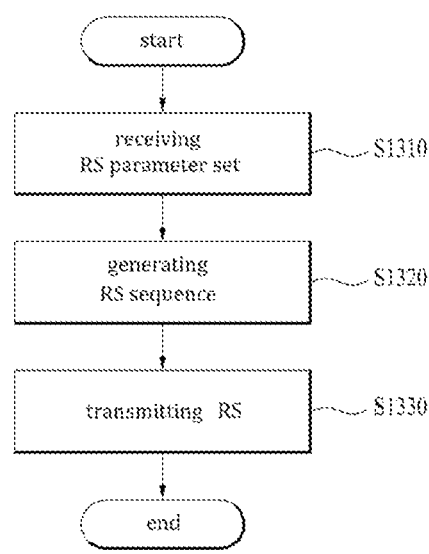
FIG. 13 is a flowchart of a method for transmitting and receiving a Reference Signal (RS), according to an embodiment of the present invention.

FIG. 13 is a flowchart of a method for transmitting and receiving an RS, according to an embodiment of the present invention.

In step S1310, a UE may receive an RS parameter set (e.g., VCI) for generating an RS sequence from a network (e.g., eNB).

The RS parameter set may be independently signaled per an RS type, or may be signaled as information commonly applied to different RS types.

Further, the RS parameter set may be explicitly signaled for a specific RS type, or may be implicitly determined based on an RS parameter set for another RS type. For example, a first RS parameter set for a first RS may be explicitly signaled, and a second RS parameter for a second RS may be implicitly determined based on the first RS parameter according to a predetermined mapping rule (e.g., one to one mapping rule). Alternatively, the second RS parameter may be implicitly determined based on first and third RS parameter sets for first and third RSs.

In addition, RS parameter set candidates may be provided through higher layer signaling (e.g., RRC signaling), and an RS parameter set to be used for RS sequence generation may be indicated among the candidates through dynamic signaling (e.g., signaling based on information included in PDCCH DCI).

The definition, configuration and signaling methods of the RS parameter set may follow the above-described embodiments of the present invention, and repeated descriptions thereof are not given here.

In step S1320, the UE may generate a sequence of a corresponding type RS based on the received RS parameter set.

In step S1330, the UE may transmit the generated RS to the network (e.g., one or more RPs).

Although not described above in relation to FIG. 13, the UE may perform an operation for detecting and receiving a DL RS (e.g., CSI-RS or UE-specific RS) using the RS parameter received in step S1310. For example, the UE may explicitly receive an RS parameter set for a DL RS from the network or implicitly determine the RS parameter set based on an RS parameter for another type RS, assume that the network (e.g., one or more TPs) has generated and transmitted the DL RS based on the determined RS parameter, and correctly detect and receive the DL RS based on the assumption.

Meanwhile, an eNB may assume that the UE has generated an RS according to the RS sequence generation method proposed by the present invention, and detect the RS transmitted by the UE based on the assumption.

The above-described embodiments of the present invention may be applied independently or two or more embodiments may be simultaneously applied, and repeated descriptions thereof are not given here for clarity.

Figure 14:
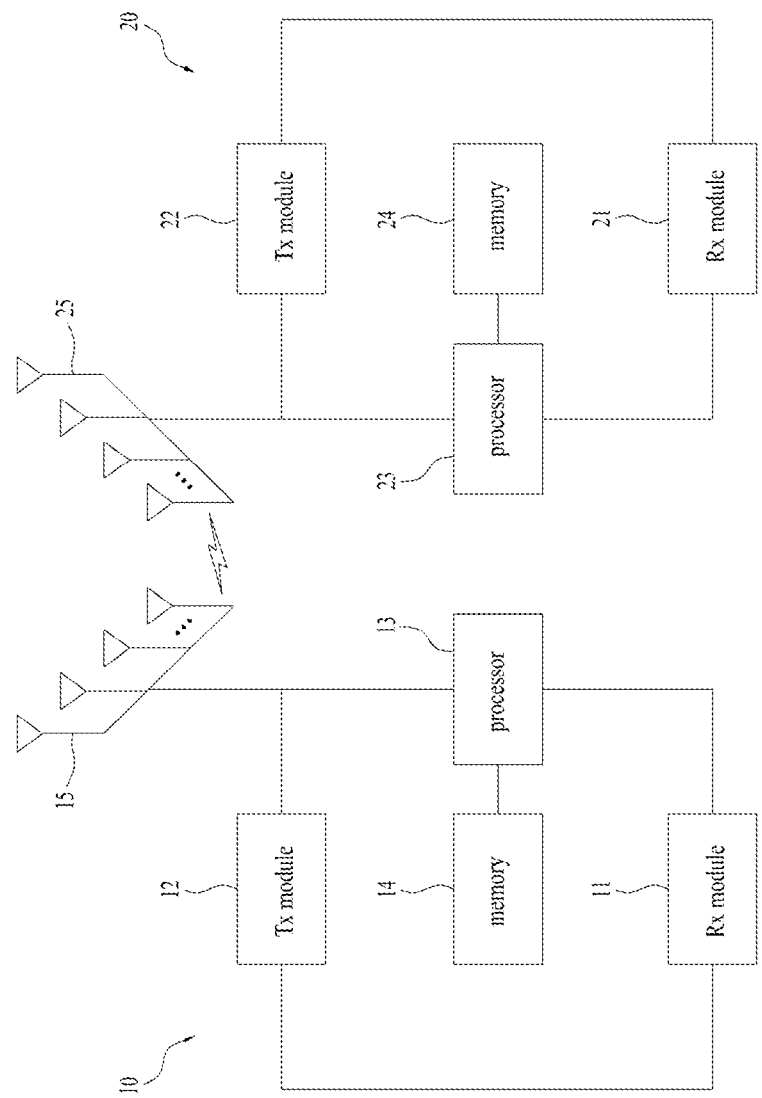
FIG. 14 is a block diagram of a UE and an eNB according to an embodiment of the present invention.

FIG. 14 is a block diagram of a UE 10 and an eNB 20 according to an embodiment of the present invention.

Referring to FIG. 14, the UE 10 may include a transmitter 11, a receiver 12, a processor 13, a memory 14 and a plurality of antennas 15. The antennas 15 refer to terminal devices supporting MIMO transmission and reception. The transmitter 11 may transmit various signals, data and information to an external device (e.g., eNB). The receiver 12 may receive various signals, data and information from the external device (e.g., eNB). The processor 13 may provide overall control to the UE 10.

The UE 10 may be configured to transmit an uplink signal. The processor 13 of the UE 10 may be configured to receive an RS parameter set using the receiver 12, generate an RS based on the RS parameter set, and transmit the generated RS to the eNB 20. The definition, configuration and signaling methods of the RS parameter set and the RS generation and transmission methods may follow the above-described embodiments of the present invention, and repeated descriptions thereof are not given here.

In addition, the processor 13 of the UE 10 may process information received by the UE 10, information to be transmitted to an external device, etc. The memory 14 may store the processed information for a predetermined time and may be replaced with a component such as a buffer (not shown).

The above configuration of the UE 10 can be implemented in such a manner that the above-described embodiments of the present invention are applied independently or two or more embodiments are simultaneously applied thereto, and repeated descriptions thereof are not given here for clarity.

The eNB 20 may include a transmitter 21, a receiver 22, a processor 23, a memory 24 and a plurality of antennas 25. The processor 23 of the eNB 20 may be configured to assume that the UE 10 has generated an RS according to the RS sequence generation method proposed by the present invention, and detect the RS transmitted by the UE based on the assumption.

An eNB is exemplified as a downlink transmission entity or an uplink reception entity and a UE is exemplified as a downlink reception entity or an uplink transmission entity to describe the embodiments of the present invention, but the scope of the present invention is not limited thereto. For example, the description of the eNB may be equally applied to a case in which a cell, an antenna port, an antenna port group, an RRH, a transmission point, a reception point, an access point or a relay node serves as an entity of downlink transmission to a UE or an entity of uplink reception from the UE. Further, the principle of the present invention described through the various embodiment of the present invention may be equally applied to a case in which a relay node serves as an entity of downlink transmission to a UE or an entity of uplink reception from the UE or a case in which a relay node serves as an entity of uplink transmission to an eNB or an entity of downlink reception from the eNB.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method for transmitting an uplink (UL) signal by a User Equipment (UE) in a wireless communication system, the method comprising:
receiving, via radio resource control (RRC) signaling, information about a plurality of downlink (DL) parameter set candidates, each of the DL parameter set candidates including a virtual cell identifier (VCI) and a sequence shift offset (Δss) used to generate a sequence of a DL Reference Signal (RS);
receiving, via a physical downlink control channel (PDCCH), downlink control information (DCI); and
generating and transmitting a sequence of a UL RS according to the uplink grant, using a UL parameter set determined based on the DL parameter set candidates,
wherein the DCI includes a field indicating a DL parameter set among the plurality of DL parameter set candidates, and
wherein in generating the sequence of the UL RS, a VCI and a sequence shift offset (Δss) in the UL parameter set are obtained from a VCI and a sequence shift offset (Δss) in the DL parameter set indicated by the DCI.

2. The method according to claim 1, wherein a group hopping pattern of the UL RS is determined based on a Physical Cell Identifier (PCI), and
wherein a sequence hopping pattern of the UL RS is determined based on the UL parameter set determined among the DL parameter set candidates.

3. The method according to claim 1, wherein a group hopping pattern of the UL RS is determined based on the UL parameter set determined among the DL parameter set candidates, and
wherein a sequence hopping pattern of the UL RS is determined based on a Physical Cell Identifier (PCI).

4. The method according to claim 1, further comprising receiving information about candidates of a third parameter set used to generate a sequence of a third RS.

5. The method according to claim 4, wherein a group hopping pattern of the UL RS is determined based on the UL parameter set determined among the of the DL parameter set candidates, and
wherein a sequence hopping pattern of the UL RS is determined based on the UL parameter set determined among the candidates of the third parameter set.

6. The method according to claim 4, wherein the third RS is a physical uplink shared channel demodulation RS (PUSCH DMRS).

7. The method according to claim 1, wherein the UL RS is a Sounding Reference Signal (SRS).

8. The method according to claim 1, wherein the DL RS is a Channel State Information (CSI)-RS or a UE-specific RS.

9. A User Equipment (UE) for transmitting an uplink (UL) signal, the UE comprising:
a receiver configured to receive, via radio resource control (RRC) signaling, information about a plurality of downlink (DL) parameter set candidates, each of the DL parameter set candidates including a virtual cell identifier (VCI) and a sequence shift offset (Δss) used to generate a sequence of a DL Reference Signal (RS), and to receive, via a physical downlink control channel (PDCCH), downlink control information (DCI);
a processor configured to generate a sequence of a UL RS according to a UL grant, using a UL parameter set determined based on the DL parameter set candidates; and
a transmitter configured to transmit the sequence of the UL RS,
wherein the DCI includes a field indicating a DL parameter set among the plurality of DL parameter set candidates, and
wherein in generating the sequence of the UL RS, a VCI and a sequence shift offset (Δss) in the UL parameter set are obtained from a VCI and a sequence shift offset (Δss) in the DL parameter set indicated by the DCI.

10. The method according to claim 1, wherein the DL parameter set indicated by the field of the DCI is commonly applied to at least two different types of UL RSs including a UL demodulation RS (DMRS) and a sounding RS (SRS).

11. The method according to claim 1, wherein a sequence shift pattern of the UL RS is determined by an equation:

$$\{(X \bmod 30) + Y\} \bmod 30,$$

where 'X' denotes the VCI in the UL parameter set, and 'Y' denotes the sequence shift offset (Δss) in the UL parameter set.

12. The method according to claim 1, wherein the VCI and the sequence shift offset (Δss) in the UL parameter set are synchronized with the VCI and the sequence shift offset (Δss) in the DL parameter set indicated by the field of the DCL.

13. The UE according to claim 9, wherein the DL parameter set indicated by the field of the DCI is commonly applied to at least two different types of UL RSs including a UL demodulation RS (DMRS) and a sounding RS (SRS).

14. The UE according to claim 9, wherein a sequence shift pattern of the UL RS is determined by an equation:

$$\{(X \bmod 30)+Y\} \bmod 30,$$

where 'X' denotes the VCI in the UL parameter set, and 'Y' denotes the sequence shift offset ($\Delta ss$) in the UL parameter set.

15. The UE according to claim 9, wherein the VCI and the sequence shift offset ($\Delta ss$) in the UL parameter set are synchronized with the VCI and the sequence shift offset ($\Delta ss$) in the DL parameter set indicated by the field of the DCI.

\* \* \* \* \*